(12) United States Patent
Katircioglu

(10) Patent No.: US 7,809,456 B2
(45) Date of Patent: Oct. 5, 2010

(54) SYSTEM AND PROCESS FOR SUPPLY MANAGEMENT FOR THE ASSEMBLY OF EXPENSIVE PRODUCTS

(75) Inventor: Kaan Kudsi Katircioglu, Yorktown Heights, NY (US)

(73) Assignee: International Business Machines Corporation, Amonk, NY (US)

( * ) Notice: Subject to any disclaimer, the term of this patent is extended or adjusted under 35 U.S.C. 154(b) by 10 days.

(21) Appl. No.: 12/174,770

(22) Filed: Jul. 17, 2008

(65) Prior Publication Data

US 2008/0275796 A1    Nov. 6, 2008

Related U.S. Application Data

(63) Continuation of application No. 11/434,283, filed on May 16, 2006, now Pat. No. 7,418,307.

(51) Int. Cl.
*G06F 19/00* (2006.01)
*G06Q 10/00* (2006.01)

(52) U.S. Cl. ..................... 700/99; 700/106; 700/108; 705/8; 705/28

(58) Field of Classification Search ............... 700/99, 700/106, 108; 705/7–9, 28
See application file for complete search history.

(56) References Cited

U.S. PATENT DOCUMENTS

| | | | | |
|---|---|---|---|---|
| 7,236,844 | B1 * | 6/2007 | Bai et al. ................ | 700/100 |
| 7,418,307 | B2 * | 8/2008 | Katircioglu ............. | 700/106 |
| 7,499,766 | B2 * | 3/2009 | Knight et al. ............ | 700/107 |
| 2002/0065692 | A1 * | 5/2002 | Nishimoto et al. ........ | 705/7 |
| 2002/0178049 | A1 * | 11/2002 | Bye ...................... | 705/11 |
| 2003/0033179 | A1 * | 2/2003 | Katz et al. .............. | 705/7 |
| 2005/0216280 | A1 * | 9/2005 | Beddingfield et al. ..... | 705/1 |
| 2006/0053063 | A1 * | 3/2006 | Nagar .................... | 705/26 |

OTHER PUBLICATIONS

Anonymous Supplier Selection & Management Report Improve Suppliers' Performance With These Tips, Tactics, Strategies Jan. 2005, pp. 10-11.*

* cited by examiner

*Primary Examiner*—Albert DeCady
*Assistant Examiner*—Steven R Garland
(74) *Attorney, Agent, or Firm*—Whitham, Curtis, Christofferson, Cook, P.C.; Stephen C. Kaufman

(57) ABSTRACT

A Managing component supply for complex products is achieved by monitoring the delivery performance of component suppliers and optimizing the times at which orders are placed. Supply delivery performance targets are set for each supplier, and component order times are optimized by 1) optimizing safety stock for each component, 2) calculating optimal times to place supply orders in order to maintain the safety stock level, and then 3) iterating safety stock calculations in order to minimize overall inventory costs and maximize supply availability. The process takes into account supply lead times, component costs, and target tolerances for delays in the assembly of components. The effects of changes in supply lead time performance on assembly schedules are projected for planning purposes.

17 Claims, 15 Drawing Sheets

| | | PO data 1 | | PO data 2 | | PO data 3 | | PO data 4 | | PO data 5 | | PO data 6 | |
|---|---|---|---|---|---|---|---|---|---|---|---|---|---|
| | Supplier | Date of order | Date of supply receipt | Date of order | Date of supply receipt | Date of order | Date of supply receipt | Date of order | Date of supply receipt | Date of order | Date of supply receipt | Date of order | Date of supply receipt |
| Component 1 | Taiwan | 1/10/2003 | 11/5/2003 | 1/25/2003 | 11/10/2003 | 2/9/2003 | 12/13/2003 | 2/24/2003 | 12/30/2003 | 3/11/2003 | 11/10/2004 | 3/26/2003 | 11/18/2004 |
| Component 2 | Mexico | 1/11/2003 | 3/16/2003 | 1/26/2003 | 3/29/2003 | 2/10/2003 | 4/12/2003 | 2/25/2003 | 5/12/2003 | 3/12/2003 | 5/17/2003 | 3/27/2003 | 6/10/2003 |
| Component 3 | US | 1/12/2003 | 6/29/2003 | 1/27/2003 | 7/15/2003 | 2/11/2003 | 7/4/2003 | 2/26/2003 | 7/19/2003 | 3/13/2003 | 7/20/2003 | 3/28/2003 | 9/19/2003 |
| Component 4 | Europe | 1/13/2003 | 1/23/2003 | 1/28/2003 | 2/6/2003 | 2/12/2003 | 2/21/2003 | 2/27/2003 | 3/7/2003 | 3/14/2003 | 3/24/2003 | 3/29/2003 | 4/6/2003 |
| Component 5 | Taiwan | 1/14/2003 | 3/17/2003 | 1/29/2003 | 3/26/2003 | 2/13/2003 | 4/9/2003 | 2/28/2003 | 5/15/2003 | 3/15/2003 | 5/20/2003 | 3/30/2003 | 5/26/2003 |
| Component 6 | Mexico | 1/15/2003 | 11/10/2003 | 1/30/2003 | 10/28/2003 | 2/14/2003 | 12/8/2003 | 3/1/2003 | 10/16/2003 | 3/16/2003 | 10/17/2003 | 3/31/2003 | 12/30/2003 |
| Component 7 | US | 1/16/2003 | 1/26/2003 | 1/31/2003 | 2/10/2003 | 2/15/2003 | 2/25/2003 | 3/2/2003 | 3/11/2003 | 3/17/2003 | 3/28/2003 | 4/1/2003 | 4/12/2003 |
| Component 8 | Europe | 1/17/2003 | 3/29/2003 | 2/1/2003 | 4/28/2003 | 2/16/2003 | 5/20/2003 | 3/3/2003 | 5/12/2003 | 3/18/2003 | 6/5/2003 | 4/2/2003 | 6/22/2003 |
| Component 9 | Taiwan | 1/18/2003 | 3/26/2003 | 2/2/2003 | 4/12/2003 | 2/17/2003 | 5/2/2003 | 3/4/2003 | 5/11/2003 | 3/19/2003 | 5/28/2003 | 4/3/2003 | 6/15/2003 |
| Component 10 | Mexico | 1/19/2003 | 9/4/2003 | 2/3/2003 | 9/11/2003 | 2/18/2003 | 10/27/2003 | 3/5/2003 | 12/21/2003 | 3/20/2003 | 11/22/2003 | 4/4/2003 | 12/29/2003 |
| Component 11 | US | 1/20/2003 | 8/26/2003 | 2/4/2003 | 9/18/2003 | 2/19/2003 | 9/16/2003 | 3/6/2003 | 10/1/2003 | 3/21/2003 | 1/1/2004 | 4/5/2003 | 12/27/2003 |
| Component 12 | Europe | 1/21/2003 | 11/9/2003 | 2/5/2003 | 10/13/2003 | 2/20/2003 | 10/3/2003 | 3/7/2003 | 12/22/2003 | 3/22/2003 | 10/22/2003 | 4/6/2003 | 12/20/2003 |
| Component 13 | Taiwan | 1/21/2003 | 7/16/2003 | 2/5/2003 | 10/10/2003 | 2/20/2003 | 9/25/2003 | 3/7/2003 | 9/25/2003 | 3/22/2003 | 10/1/2003 | 4/6/2003 | 10/13/2003 |
| Component 14 | Mexico | 1/21/2003 | 8/20/2003 | 2/5/2003 | 10/12/2003 | 2/20/2003 | 11/5/2003 | 3/7/2003 | 12/25/2003 | 3/22/2003 | 1/20/2004 | 4/6/2003 | 11/18/2003 |
| Component 15 | US | 1/21/2003 | 10/16/2003 | 2/5/2003 | 11/19/2003 | 2/20/2003 | 10/30/2003 | 3/7/2003 | 11/21/2003 | 3/22/2003 | 11/18/2003 | 4/6/2003 | 1/16/2004 |
| Component 16 | Europe | 1/21/2003 | 10/26/2003 | 2/5/2003 | 12/5/2003 | 2/20/2003 | 9/26/2003 | 3/7/2003 | 11/17/2003 | 3/22/2003 | 10/22/2003 | 4/6/2003 | 2/9/2004 |
| Component 17 | Taiwan | 1/21/2003 | 9/17/2003 | 2/5/2003 | 10/1/2003 | 2/20/2003 | 9/30/2003 | 3/7/2003 | 10/21/2003 | 3/22/2003 | 11/8/2003 | 4/6/2003 | 1/10/2004 |
| Component 18 | Mexico | 1/21/2003 | 5/30/2003 | 2/5/2003 | 6/9/2003 | 2/20/2003 | 6/30/2003 | 3/7/2003 | 7/19/2003 | 3/22/2003 | 8/14/2003 | 4/6/2003 | 8/20/2003 |
| Component 19 | US | 1/21/2003 | 9/10/2003 | 2/5/2003 | 9/16/2003 | 2/20/2003 | 11/9/2003 | 3/7/2003 | 11/4/2003 | 3/22/2003 | 1/28/2004 | 4/6/2003 | 11/18/2003 |
| Component 20 | Europe | 1/21/2003 | 7/13/2003 | 2/5/2003 | 8/7/2003 | 2/20/2003 | 8/31/2003 | 3/7/2003 | 11/8/2003 | 3/22/2003 | 9/14/2003 | 4/6/2003 | 10/10/2003 |
| Component 21 | Taiwan | 1/21/2003 | 4/27/2003 | 2/5/2003 | 4/21/2003 | 2/20/2003 | 5/1/2003 | 3/7/2003 | 5/24/2003 | 3/22/2003 | 6/17/2003 | 4/6/2003 | 6/20/2003 |
| Component 22 | Mexico | 1/21/2003 | 10/24/2003 | 2/5/2003 | 11/26/2003 | 2/20/2003 | 11/11/2003 | 3/7/2003 | 12/30/2003 | 3/22/2003 | 12/8/2003 | 4/6/2003 | 2/7/2004 |
| Component 23 | US | 1/21/2003 | 11/11/2003 | 2/5/2003 | 9/20/2003 | 2/20/2003 | 10/5/2003 | 3/7/2003 | 12/18/2003 | 3/22/2003 | 1/17/2004 | 4/6/2003 | 11/25/2003 |
| Component 24 | Europe | 1/21/2003 | 9/3/2003 | 2/5/2003 | 9/16/2003 | 2/20/2003 | 9/29/2003 | 3/7/2003 | 8/26/2003 | 3/22/2003 | 8/28/2003 | 4/6/2003 | 11/25/2003 |
| Component 25 | Taiwan | 1/21/2003 | 8/20/2003 | 2/5/2003 | 8/31/2003 | 2/20/2003 | 12/15/2003 | 3/7/2003 | 11/21/2003 | 3/22/2003 | 10/31/2003 | 4/6/2003 | 11/28/2003 |
| Component 26 | Mexico | 1/21/2003 | 8/16/2003 | 2/5/2003 | 11/22/2003 | 2/20/2003 | 9/19/2003 | 3/7/2003 | 12/27/2003 | 3/22/2003 | 12/2/2003 | 4/6/2003 | 1/28/2004 |
| Component 27 | US | 1/21/2003 | 3/28/2003 | 2/5/2003 | 4/11/2003 | 2/20/2003 | 4/20/2003 | 3/7/2003 | 5/12/2003 | 3/22/2003 | 6/6/2003 | 4/6/2003 | 6/2/2003 |

*Figure 2A*

| | LEAD TIME DATA | | | | | | | | | | | | | | | | |
|---|---|---|---|---|---|---|---|---|---|---|---|---|---|---|---|---|---|
| Supplier | Lead time 1 | Lead time 2 | Lead time 3 | Lead time 4 | Lead time 5 | Lead time 6 | Lead time 7 | Lead time 8 | Lead time 9 | Lead time 10 | Lead time 11 | Lead time 12 | Lead time 13 | Lead time 14 | Lead time 15 | Lead time 16 | Lead time 17 |
| Component 1 Taiwan | 299 | 289 | 307 | 309 | 244 | 238 | 301 | 284 | 315 | 279 | 329 | 244 | 264 | 292 | 313 | 274 | 330 |
| Component 2 Mexico | 65 | 63 | 61 | 77 | 67 | 76 | 55 | 65 | 62 | 67 | 61 | 55 | 67 | 74 | 65 | 65 | 51 |
| Component 3 US | 169 | 170 | 143 | 144 | 129 | 176 | 165 | 158 | 131 | 167 | 151 | 162 | 162 | 176 | 172 | 170 | 150 |
| Component 4 Europe | 10 | 9 | 10 | 8 | 11 | 8 | 10 | 11 | 9 | 9 | 10 | 8 | 8 | 11 | 10 | 11 | 9 |
| Component 5 Taiwan | 62 | 56 | 55 | 77 | 66 | 57 | 55 | 76 | 52 | 61 | 61 | 62 | 61 | 55 | 68 | 68 | 55 |
| Component 6 Mexico | 300 | 272 | 298 | 230 | 215 | 275 | 256 | 242 | 255 | 231 | 249 | 279 | 291 | 292 | 224 | 243 | 308 |
| Component 7 US | 11 | 11 | 11 | 9 | 12 | 11 | 11 | 11 | 10 | 12 | 11 | 9 | 9 | 8 | 9 | 9 | 10 |
| Component 8 Europe | 72 | 87 | 94 | 70 | 80 | 82 | 71 | 94 | 89 | 84 | 87 | 85 | 69 | 71 | 95 | 98 | 75 |
| Component 9 Taiwan | 67 | 69 | 75 | 68 | 70 | 73 | 74 | 73 | 69 | 66 | 75 | 64 | 57 | 61 | 57 | 61 | 69 |
| Component 10 Mexico | 229 | 221 | 251 | 291 | 247 | 270 | 238 | 258 | 263 | 287 | 247 | 226 | 243 | 241 | 259 | 249 | 249 |
| Component 11 US | 219 | 227 | 209 | 209 | 286 | 267 | 284 | 264 | 222 | 220 | 276 | 220 | 225 | 240 | 278 | 251 | 278 |
| Component 12 Europe | 292 | 250 | 225 | 271 | 215 | 258 | 250 | 239 | 270 | 300 | 236 | 247 | 274 | 313 | 292 | 239 | 235 |
| Component 13 Taiwan | 176 | 245 | 117 | 202 | 194 | 191 | 195 | 227 | 189 | 184 | 220 | 198 | 196 | 240 | 193 | 221 | 208 |
| Component 14 Mexico | 212 | 250 | 259 | 294 | 304 | 226 | 260 | 285 | 235 | 245 | 212 | 233 | 281 | 250 | 207 | 233 | 240 |
| Component 15 US | 268 | 287 | 252 | 260 | 242 | 286 | 232 | 297 | 283 | 272 | 204 | 279 | 218 | 291 | 259 | 295 | 286 |
| Component 16 Europe | 279 | 304 | 219 | 256 | 214 | 309 | 298 | 220 | 258 | 266 | 265 | 276 | 311 | 222 | 240 | 260 | 241 |
| Component 17 Taiwan | 239 | 238 | 222 | 229 | 231 | 279 | 244 | 232 | 215 | 294 | 295 | 221 | 240 | 246 | 301 | 255 | 249 |
| Component 18 Mexico | 130 | 125 | 131 | 135 | 145 | 136 | 154 | 150 | 148 | 124 | 144 | 133 | 132 | 142 | 122 | 105 | 121 |
| Component 19 US | 233 | 224 | 263 | 242 | 313 | 227 | 308 | 301 | 223 | 218 | 249 | 257 | 232 | 319 | 315 | 243 | 287 |
| Component 20 Europe | 173 | 184 | 193 | 246 | 176 | 187 | 181 | 173 | 212 | 245 | 214 | 215 | 244 | 177 | 190 | 230 | 206 |
| Component 21 Taiwan | 96 | 76 | 71 | 79 | 88 | 75 | 98 | 73 | 70 | 82 | 86 | 69 | 79 | 85 | 81 | 94 | 90 |
| Component 22 Mexico | 277 | 294 | 264 | 299 | 261 | 308 | 237 | 234 | 228 | 232 | 247 | 286 | 252 | 250 | 320 | 229 | 321 |
| Component 23 US | 295 | 227 | 227 | 287 | 301 | 233 | 217 | 235 | 226 | 276 | 259 | 232 | 230 | 217 | 255 | 290 | 221 |
| Component 24 Europe | 226 | 223 | 222 | 172 | 159 | 234 | 204 | 222 | 225 | 162 | 187 | 213 | 211 | 174 | 169 | 164 | 224 |
| Component 25 Taiwan | 212 | 208 | 298 | 260 | 223 | 237 | 208 | 301 | 215 | 223 | 293 | 270 | 215 | 267 | 250 | 291 | 250 |
| Component 26 Mexico | 208 | 290 | 211 | 296 | 255 | 298 | 278 | 292 | 244 | 235 | 278 | 254 | 295 | 281 | 284 | 268 | 241 |
| Component 27 US | 67 | 66 | 60 | 66 | 77 | 58 | 60 | 67 | 74 | 64 | 65 | 60 | 52 | 60 | 73 | 69 | 75 |

| | LEAD TIME PERFORMANCE SUMMARY | | |
|---|---|---|---|
| Return to architecture >> | Sample lead time mean | Sample lead time stdev | Sample lead time MAX |
| Component 1 | 299 | 28.7 | 329.7 |
| Component 2 | 64 | 7.0 | 76.6 |
| Component 3 | 159 | 14.7 | 175.7 |
| Component 4 | 10 | 1.1 | 11.4 |
| Component 5 | 62 | 7.3 | 76.6 |
| Component 6 | 262 | 29.4 | 308.5 |
| Component 7 | 10 | 1.1 | 11.8 |
| Component 8 | 83 | 9.7 | 98.0 |
| Component 9 | 68 | 5.9 | 75.0 |
| Component 10 | 251 | 19.3 | 291.3 |
| Component 11 | 246 | 28.5 | 286.0 |
| Component 12 | 259 | 28.0 | 313.0 |
| Component 13 | 206 | 19.9 | 247.9 |
| Component 14 | 249 | 29.0 | 304.1 |
| Component 15 | 265 | 27.7 | 296.5 |
| Component 16 | 261 | 32.3 | 310.9 |
| Component 17 | 249 | 27.5 | 300.9 |
| Component 18 | 134 | 12.6 | 153.9 |
| Component 19 | 262 | 36.9 | 319.4 |
| Component 20 | 203 | 26.1 | 246.1 |
| Component 21 | 82 | 9.1 | 97.6 |
| Component 22 | 267 | 32.3 | 320.9 |
| Component 23 | 249 | 29.8 | 301.3 |
| Component 24 | 199 | 27.1 | 233.6 |
| Component 25 | 248 | 33.9 | 301.2 |
| Component 26 | 265 | 29.1 | 297.6 |
| Component 27 | 65 | 6.7 | 76.5 |

*Figure 2C*

| | Supply Delivery Performance Monitor | | | | | | | | | | | |
|---|---|---|---|---|---|---|---|---|---|---|---|---|
| Return to architecture >> 112 | Historical Performance | | | | Current Performance | | | | Improvement Scores | | | |
| Component | Lead time MEAN | Lead time STDEV | Lead time MIN | Lead time MAX | Lead time MEAN | Lead time STDEV | Lead time MIN | Lead time MAX | Lead time MEAN | Lead time STDEV | Lead time MIN | Lead time MAX |
| Component 1 | 289 | 29 | 238 | 330 | 283 | 28.12 | 256 | 309 | 2% | 2% | -8% | 6% |
| Component 2 | 64 | 7 | 51 | 77 | 57 | 6.21 | 50 | 66 | 11% | 11% | 2% | 14% |
| Component 3 | 159 | 15 | 129 | 176 | 147 | 13.61 | 131 | 159 | 8% | 8% | -1% | 10% |
| Component 4 | 10 | 1 | 8 | 11 | 8 | 0.94 | 8 | 10 | 12% | 12% | 6% | 14% |
| Component 5 | 62 | 7 | 52 | 77 | 60 | 7.15 | 52 | 68 | 2% | 2% | 1% | 12% |
| Component 6 | 262 | 29 | 215 | 308 | 241 | 26.96 | 221 | 267 | 8% | 8% | -3% | 14% |
| Component 7 | 10 | 1 | 8 | 12 | 10 | 1.03 | 9 | 11 | 6% | 6% | -4% | 8% |
| Component 8 | 83 | 10 | 69 | 98 | 79 | 9.29 | 71 | 84 | 4% | 4% | -3% | 14% |
| Component 9 | 68 | 6 | 57 | 75 | 67 | 5.85 | 57 | 71 | 1% | 1% | -1% | 5% |
| Component 10 | 251 | 19 | 221 | 291 | 237 | 18.20 | 216 | 251 | 6% | 6% | 2% | 14% |
| Component 11 | 246 | 28 | 209 | 286 | 222 | 25.73 | 185 | 253 | 10% | 10% | 11% | 12% |
| Component 12 | 259 | 28 | 215 | 313 | 241 | 26.09 | 214 | 267 | 7% | 7% | 0% | 15% |
| Component 13 | 206 | 20 | 176 | 248 | 192 | 18.58 | 166 | 222 | 7% | 7% | 6% | 10% |
| Component 14 | 249 | 29 | 207 | 304 | 227 | 26.50 | 199 | 270 | 9% | 9% | 4% | 11% |
| Component 15 | 265 | 28 | 204 | 297 | 253 | 26.43 | 225 | 284 | 5% | 5% | -10% | 4% |
| Component 16 | 261 | 32 | 214 | 311 | 230 | 28.32 | 201 | 280 | 12% | 12% | 6% | 10% |
| Component 17 | 249 | 37 | 215 | 301 | 242 | 26.73 | 212 | 265 | 3% | 3% | 1% | 12% |
| Component 18 | 134 | 13 | 105 | 154 | 126 | 11.82 | 111 | 138 | 6% | 6% | -6% | 11% |
| Component 19 | 262 | 37 | 218 | 319 | 248 | 35.03 | 226 | 268 | 5% | 5% | -4% | 16% |
| Component 20 | 203 | 26 | 173 | 246 | 192 | 24.78 | 157 | 212 | 5% | 5% | 9% | 14% |
| Component 21 | 82 | 9 | 68 | 98 | 75 | 8.34 | 68 | 83 | 9% | 9% | 1% | 15% |
| Component 22 | 267 | 32 | 228 | 321 | 246 | 29.83 | 213 | 292 | 8% | 8% | 7% | 9% |
| Component 23 | 249 | 30 | 217 | 301 | 223 | 26.67 | 188 | 272 | 10% | 10% | 13% | 10% |
| Component 24 | 199 | 27 | 159 | 234 | 190 | 25.82 | 159 | 215 | 5% | 5% | 0% | 8% |
| Component 25 | 248 | 34 | 208 | 301 | 230 | 31.36 | 199 | 259 | 7% | 7% | 4% | 14% |
| Component 26 | 265 | 29 | 208 | 298 | 248 | 27.14 | 207 | 289 | 7% | 7% | 0% | 3% |
| Component 27 | 65 | 7 | 52 | 77 | 61 | 6.32 | 53 | 71 | 6% | 6% | -2% | 8% |

*Figure 2D*

| Return to architecture >> | COMPONENT COST DATA | |
|---|---|---|
| Component | Total usage cost in a unit product ($) | |
| Component 1 | $ | 72,600 |
| Component 2 | $ | 17,200 |
| Component 3 | $ | 11,500 |
| Component 4 | $ | 10,000 |
| Component 5 | $ | 8,200 |
| Component 6 | $ | 7,000 |
| Component 7 | $ | 5,000 |
| Component 8 | $ | 4,900 |
| Component 9 | $ | 4,600 |
| Component 10 | $ | 4,200 |
| Component 11 | $ | 3,900 |
| Component 12 | $ | 3,600 |
| Component 13 | $ | 3,600 |
| Component 14 | $ | 2,800 |
| Component 15 | $ | 2,800 |
| Component 16 | $ | 2,800 |
| Component 17 | $ | 2,800 |
| Component 18 | $ | 2,700 |
| Component 19 | $ | 2,500 |
| Component 20 | $ | 2,500 |
| Component 21 | $ | 2,500 |
| Component 22 | $ | 2,400 |
| Component 23 | $ | 2,400 |
| Component 24 | $ | 2,400 |
| Component 25 | $ | 2,200 |
| Component 26 | $ | 2,100 |
| Component 27 | $ | 2,100 |

Supply Order Status

| Component | Unit | | | | | | | | | | |
|---|---|---|---|---|---|---|---|---|---|---|---|
| | Date of Final Assembly | 1/20/2005 | 2/3/2005 | 2/17/2005 | 3/3/2005 | 3/17/2005 | 3/31/2005 | 4/14/2005 | 4/28/2005 | 5/12/2005 | 5/26/2005 |
| | | 1 | 2 | 3 | 4 | 5 | 6 | 7 | 8 | 9 | 10 |
| | | Order Status | Order Status | Order Status | Order Status | Order Status | Order Status | Order Status | Order Status | Order Status | Order Status |
| | Effective lead time (Inventory Policy) | Days Early (Late) | Days Early (Late) | Days Early (Late) | Days Early (Late) | Days Early (Late) | Days Early (Late) | Days Early (Late) | Days Early (Late) | Days Early (Late) | Days Early (Late) |
| Component 1 | 289 | (0) | (2) | (7) | (0) | 16 | (20) | 31 | 3 | 6 | 33 |
| Component 2 | 80 | (1) | 5 | 8 | 11 | 10 | 5 | 10 | 14 | 5 | 6 |
| Component 3 | 194 | 5 | 4 | 28 | 1 | 27 | 20 | 19 | 4 | 5 | 7 |
| Component 4 | 13 | 2 | 2 | 2 | 0 | (0) | 2 | 1 | 2 | 0 | (0) |
| Component 5 | 84 | (2) | (3) | 3 | (6) | (1) | (2) | 9 | 7 | (0) | 10 |
| Component 6 | 331 | 28 | 19 | 32 | 13 | 36 | 33 | 0 | (5) | 20 | 41 |
| Component 7 | 13 | (1) | 1 | 1 | 0 | 1 | 1 | 2 | 0 | 1 | (1) |
| Component 8 | 98 | 9 | 7 | 2 | (1) | (1) | (2) | 7 | (1) | 11 | 3 |
| Component 9 | 75 | 1 | 5 | 2 | (3) | (4) | (1) | (3) | 1 | 10 | (3) |
| Component 10 | 291 | 35 | 2 | 31 | 7 | 1 | 8 | 19 | 4 | 31 | 8 |
| Component 11 | 331 | (8) | 55 | 17 | 60 | (2) | 5 | 51 | 46 | 12 | (2) |
| Component 12 | 343 | 44 | 19 | 23 | (1) | 16 | 46 | (2) | 10 | (8) | 34 |
| Component 13 | 262 | 40 | 14 | (17) | (5) | 34 | (5) | 30 | 39 | 26 | (14) |
| Component 14 | 332 | 26 | (21) | 39 | 50 | (6) | 25 | 31 | 14 | 31 | 26 |
| Component 15 | 345 | 18 | 31 | 29 | (0) | 40 | 37 | (9) | (19) | 5 | (13) |
| Component 16 | 358 | 32 | 45 | 30 | 19 | 35 | 60 | 56 | 42 | (20) | 24 |
| Component 17 | 331 | 37 | 15 | 21 | 2 | (13) | (16) | 3 | 15 | 16 | (12) |
| Component 18 | 172 | (4) | (2) | 23 | (3) | 14 | 5 | (3) | 18 | 13 | 18 |
| Component 19 | 348 | (6) | 23 | 23 | 29 | 35 | 0 | 26 | (5) | 6 | 4 |
| Component 20 | 263 | 46 | 12 | (1) | 8 | 9 | 18 | (1) | 16 | 7 | (9) |
| Component 21 | 108 | 9 | 1 | 7 | (1) | 6 | 14 | 14 | 0 | 12 | 10 |
| Component 22 | 361 | (6) | 53 | 22 | 30 | (10) | 45 | 42 | (25) | 43 | 12 |
| Component 23 | 336 | 35 | 17 | 34 | 40 | (24) | 22 | 28 | 58 | (10) | 60 |
| Component 24 | 279 | 27 | 21 | 5 | (2) | 41 | 16 | (15) | 0 | (13) | 16 |
| Component 25 | 348 | 25 | 28 | 32 | 35 | 1 | (0) | 50 | 25 | 0 | (11) |
| Component 26 | 351 | 15 | (8) | (17) | 41 | 37 | (24) | 33 | 58 | 19 | 23 |
| Component 27 | 85 | 12 | (2) | 7 | 7 | 9 | 1 | (2) | (5) | 7 | 5 |

Return to architecture >>

| Return to architecture >> | INVENTORY POLICY | | | |
|---|---|---|---|---|
| | (0=no safety policy for the lead time uncertainty, 1=optimized, 2=fixed safety factor, 3=fixed availability target, 4=sample worst case) | | | |
| Component | Policy type | 2. Fixed safety factor target | 3. Fixed availability target | 4. Max lead time in the sample (worst case) |
| Component 1 | 1 | #N/A | #N/A | 330 |
| Component 2 | 1 | #N/A | #N/A | 77 |
| Component 3 | 1 | #N/A | #N/A | 176 |
| Component 4 | 2 | 3.00 | #N/A | 11 |
| Component 5 | 2 | 3.00 | #N/A | 77 |
| Component 6 | 3 | #N/A | 99.00% | 308 |
| Component 7 | 3 | #N/A | 99.00% | 12 |
| Component 8 | 4 | #N/A | #N/A | 98 |
| Component 9 | 4 | #N/A | #N/A | 75 |
| Component 10 | 4 | #N/A | #N/A | 291 |
| Component 11 | 2 | 3.00 | #N/A | 286 |
| Component 12 | 2 | 3.00 | #N/A | 313 |
| Component 13 | 1 | #N/A | #N/A | 248 |
| Component 14 | 1 | #N/A | #N/A | 304 |
| Component 15 | 1 | #N/A | #N/A | 297 |
| Component 16 | 2 | 3.00 | #N/A | 311 |
| Component 17 | 2 | 3.00 | #N/A | 301 |
| Component 18 | 2 | 3.00 | #N/A | 154 |
| Component 19 | 3 | #N/A | 99.00% | 319 |
| Component 20 | 3 | #N/A | 99.00% | 246 |
| Component 21 | 1 | #N/A | #N/A | 98 |
| Component 22 | 1 | #N/A | #N/A | 321 |
| Component 23 | 1 | #N/A | #N/A | 301 |
| Component 24 | 1 | #N/A | #N/A | 234 |
| Component 25 | 1 | #N/A | #N/A | 301 |
| Component 26 | 1 | #N/A | #N/A | 298 |
| Component 27 | 1 | #N/A | #N/A | 77 |

| Return to architecture >> | Optimal Times for Supply Orders | | | | | | | | |
|---|---|---|---|---|---|---|---|---|---|
| Component | Policy type | 1. Optimized safety factor | 2. Fixed safety factor | 3. Fixed availability target | 4. Max lead time in the sample (worst case) | Lead time mean | Lead time stdev | Safety lead time | Effective lead time (Inventory Policy) |
| Component 1 | 9 | 1.64 | #N/A | #N/A | 328 | 282 | 33 | - | 282 |
| Component 2 | 1 | 2.25 | #N/A | #N/A | 76 | 64 | 7 | 17 | 81 |
| Component 3 | 1 | 2.40 | #N/A | #N/A | 179 | 153 | 18 | 43 | 195 |
| Component 4 | 2 | 2.45 | 3.00 | #N/A | 12 | 10 | 1 | 4 | 14 |
| Component 5 | 2 | 2.52 | 3.00 | #N/A | 72 | 61 | 6 | 19 | 81 |
| Component 6 | 3 | 2.57 | #N/A | 99.00% | 310 | 264 | 35 | 81 | 345 |
| Component 7 | 3 | 2.68 | #N/A | 99.00% | 12 | 10 | 1 | 3 | 13 |
| Component 8 | 4 | 2.69 | #N/A | #N/A | 101 | 87 | 10 | 14 | 101 |
| Component 9 | 4 | 2.71 | #N/A | #N/A | 76 | 65 | 8 | 11 | 76 |
| Component 10 | 4 | 2.74 | #N/A | #N/A | 311 | 259 | 34 | 52 | 311 |
| Component 11 | 2 | 2.77 | 3.00 | #N/A | 304 | 258 | 52 | 95 | 353 |
| Component 12 | 2 | 2.79 | 3.00 | #N/A | 306 | 253 | 26 | 77 | 331 |
| Component 13 | 1 | 2.79 | #N/A | #N/A | 254 | 212 | 25 | 71 | 283 |
| Component 14 | 1 | 2.87 | #N/A | #N/A | 303 | 257 | 31 | 90 | 347 |
| Component 15 | 1 | 2.87 | #N/A | #N/A | 295 | 241 | 29 | 83 | 324 |
| Component 16 | 2 | 2.88 | 3.00 | #N/A | 311 | 261 | 35 | 106 | 367 |
| Component 17 | 2 | 2.88 | 3.00 | #N/A | 311 | 258 | 27 | 82 | 340 |
| Component 18 | 2 | 2.89 | 3.00 | #N/A | 149 | 131 | 15 | 44 | 175 |
| Component 19 | 3 | 2.91 | #N/A | 99.00% | 313 | 268 | 28 | 65 | 333 |
| Component 20 | 3 | 2.91 | #N/A | 99.00% | 250 | 218 | 23 | 53 | 270 |
| Component 21 | 1 | 2.91 | #N/A | #N/A | 101 | 90 | 9 | 26 | 116 |
| Component 22 | 1 | 2.92 | #N/A | #N/A | 321 | 270 | 39 | 114 | 384 |
| Component 23 | 1 | 2.92 | #N/A | #N/A | 317 | 272 | 33 | 97 | 369 |
| Component 24 | 1 | 2.92 | #N/A | #N/A | 234 | 195 | 25 | 73 | 268 |
| Component 25 | 1 | 2.95 | #N/A | #N/A | 304 | 256 | 31 | 91 | 347 |
| Component 26 | 1 | 2.96 | #N/A | #N/A | 300 | 255 | 33 | 99 | 354 |
| Component 27 | 1 | 2.97 | #N/A | #N/A | 76 | 63 | 6 | 17 | 80 |

| | Supply Order Schedule | | | | | | | | | | |
|---|---|---|---|---|---|---|---|---|---|---|---|
| Return to architecture >> | | | | | | | | | | | |
| | Unit | 1 | 2 | 3 | 4 | 5 | 6 | 7 | 8 | 9 | 10 |
| | Date of Final Assembly | 1/20/2005 | 2/3/2005 | 2/17/2005 | 3/3/2005 | 3/17/2005 | 3/31/2005 | 4/14/2005 | 4/28/2005 | 5/12/2005 | 5/26/2005 |
| Component | Effective lead time (Inventory Policy) | Time of order | Time of order | Time of order | Time of order | Time of order | Time of order | Time of order | Time of order | Time of order | Time of order |
| Component 1 | 282 | 4/13/2004 | 4/27/2004 | 5/11/2004 | 5/25/2004 | 6/8/2004 | 6/22/2004 | 7/6/2004 | 7/20/2004 | 8/3/2004 | 8/17/2004 |
| Component 2 | 81 | 10/31/2004 | 11/14/2004 | 11/28/2004 | 12/12/2004 | 12/26/2004 | 1/9/2005 | 1/23/2005 | 2/6/2005 | 2/20/2005 | 3/6/2005 |
| Component 3 | 195 | 7/8/2004 | 7/22/2004 | 8/5/2004 | 8/19/2004 | 9/2/2004 | 9/16/2004 | 9/30/2004 | 10/14/2004 | 10/28/2004 | 11/11/2004 |
| Component 4 | 14 | 1/5/2005 | 1/19/2005 | 2/2/2005 | 2/16/2005 | 3/2/2005 | 3/16/2005 | 3/30/2005 | 4/13/2005 | 4/27/2005 | 5/11/2005 |
| Component 5 | 81 | 10/31/2004 | 11/14/2004 | 11/28/2004 | 12/12/2004 | 12/26/2004 | 1/9/2005 | 1/23/2005 | 2/6/2005 | 2/20/2005 | 3/6/2005 |
| Component 6 | 345 | 2/10/2004 | 2/24/2004 | 3/9/2004 | 3/23/2004 | 4/6/2004 | 4/20/2004 | 5/4/2004 | 5/18/2004 | 6/1/2004 | 6/15/2004 |
| Component 7 | 13 | 1/7/2005 | 1/21/2005 | 2/4/2005 | 2/18/2005 | 3/4/2005 | 3/18/2005 | 4/1/2005 | 4/15/2005 | 4/29/2005 | 5/13/2005 |
| Component 8 | 101 | 10/10/2004 | 10/24/2004 | 11/7/2004 | 11/21/2004 | 12/5/2005 | 12/19/2004 | 1/2/2005 | 1/16/2005 | 1/30/2005 | 2/13/2005 |
| Component 9 | 76 | 11/14/2004 | 11/18/2004 | 12/2/2004 | 12/16/2004 | 12/30/2004 | 1/13/2005 | 1/27/2005 | 2/10/2005 | 2/24/2005 | 3/10/2005 |
| Component 10 | 311 | 3/14/2004 | 3/28/2004 | 4/11/2004 | 4/25/2004 | 5/9/2004 | 5/23/2004 | 6/6/2004 | 6/20/2004 | 7/24/2004 | 7/18/2004 |
| Component 11 | 353 | 2/2/2004 | 2/16/2004 | 3/1/2004 | 3/15/2004 | 3/29/2004 | 4/12/2004 | 4/26/2004 | 5/10/2004 | 5/24/2004 | 6/7/2004 |
| Component 12 | 331 | 2/24/2004 | 3/9/2004 | 3/23/2004 | 4/6/2004 | 4/20/2004 | 5/4/2004 | 5/18/2004 | 6/1/2004 | 6/15/2004 | 6/29/2004 |
| Component 13 | 283 | 4/12/2004 | 4/26/2004 | 5/10/2004 | 5/24/2004 | 6/7/2004 | 6/21/2004 | 7/5/2004 | 7/19/2004 | 8/2/2004 | 8/16/2004 |
| Component 14 | 347 | 2/8/2004 | 2/22/2004 | 3/7/2004 | 3/21/2004 | 4/4/2004 | 4/18/2004 | 5/2/2004 | 5/16/2004 | 5/30/2004 | 6/13/2004 |
| Component 15 | 324 | 3/1/2004 | 3/15/2004 | 3/29/2004 | 4/12/2004 | 4/26/2004 | 5/10/2004 | 5/24/2004 | 6/7/2004 | 6/21/2004 | 7/5/2004 |
| Component 16 | 367 | 1/19/2004 | 2/2/2004 | 2/16/2004 | 3/1/2004 | 3/15/2004 | 3/29/2004 | 4/12/2004 | 4/26/2004 | 5/10/2004 | 5/24/2004 |
| Component 17 | 340 | 2/15/2004 | 2/28/2004 | 3/14/2004 | 3/28/2004 | 4/11/2004 | 4/25/2004 | 5/9/2004 | 5/23/2004 | 6/6/2004 | 6/20/2004 |
| Component 18 | 175 | 7/29/2004 | 8/12/2004 | 8/26/2004 | 9/9/2004 | 9/23/2004 | 10/7/2004 | 10/21/2004 | 11/4/2004 | 11/18/2004 | 12/2/2004 |
| Component 19 | 333 | 2/21/2004 | 3/6/2004 | 3/20/2004 | 4/3/2004 | 4/17/2004 | 5/1/2004 | 5/15/2004 | 5/29/2004 | 6/12/2004 | 6/26/2004 |
| Component 20 | 270 | 4/24/2004 | 5/8/2004 | 5/22/2004 | 6/5/2004 | 6/19/2004 | 7/3/2004 | 7/17/2004 | 7/31/2004 | 8/14/2004 | 8/28/2004 |
| Component 21 | 116 | 9/26/2004 | 10/10/2004 | 10/24/2004 | 11/7/2004 | 11/21/2004 | 12/5/2004 | 12/19/2004 | 1/2/2005 | 1/16/2005 | 1/30/2005 |
| Component 22 | 384 | 1/1/2004 | 1/15/2004 | 1/29/2004 | 2/12/2004 | 2/26/2004 | 3/11/2004 | 3/25/2004 | 4/5/2004 | 4/22/2004 | 5/6/2004 |
| Component 23 | 369 | 1/16/2004 | 1/30/2004 | 2/13/2004 | 2/27/2004 | 3/12/2004 | 3/26/2004 | 4/9/2004 | 4/23/2004 | 5/7/2004 | 5/21/2004 |
| Component 24 | 268 | 4/27/2004 | 5/11/2004 | 5/25/2004 | 6/8/2004 | 6/22/2004 | 7/6/2004 | 7/20/2004 | 8/3/2004 | 8/17/2004 | 8/31/2004 |
| Component 25 | 347 | 2/8/2004 | 2/22/2004 | 3/7/2004 | 3/21/2004 | 4/4/2004 | 4/18/2004 | 5/2/2004 | 5/16/2004 | 5/30/2004 | 6/13/2004 |
| Component 26 | 354 | 1/31/2004 | 2/14/2004 | 2/28/2004 | 3/13/2004 | 3/27/2004 | 4/10/2004 | 4/24/2004 | 5/8/2004 | 5/22/2004 | 6/5/2004 |
| Component 27 | 80 | 10/31/2004 | 11/14/2004 | 11/28/2004 | 12/12/2004 | 12/26/2004 | 1/9/2005 | 1/23/2005 | 2/6/2005 | 2/20/2005 | 3/6/2005 |

| | Projected Supply Delays | | | | | | | | | | | | |
|---|---|---|---|---|---|---|---|---|---|---|---|---|---|
| Return to architecture >> | Unit | | | | 1 | 2 | 3 | 4 | 5 | 6 | 7 | 8 | 9 | 10 |
| | Date of Final Assembly | | | | 1/20/2005 | 2/3/2005 | 2/17/2005 | 3/3/2005 | 3/17/2005 | 3/31/2005 | 4/14/2005 | 4/28/2005 | 5/12/2005 | 5/26/2005 |
| | Net supply delay to assembly (days) | | | | 2.26 | 8.92 | 19.13 | 10.14 | 14.52 | 16.48 | 11.49 | 9.30 | 15.98 | 6.93 |
| | Effective lead time (Inventory Policy) | Sample lead time mean | Sample lead time stdev | | Delay (days) | Delay (days) | Delay (days) | Delay (days) | Delay (days) | Delay (days) | Delay (days) | Delay (days) | Delay (days) | Delay (days) |
| Component 1 | 282 | 282 | 33 | | 2.26 | 8.92 | 19.13 | 10.14 | 14.52 | 16.48 | 11.49 | 9.30 | 15.98 | 6.93 |
| Component 2 | 81 | 64 | 7 | | 0.00 | 0.07 | 0.05 | 0.05 | 0.01 | 0.01 | 0.25 | 0.00 | 0.00 | 0.01 |
| Component 3 | 195 | 153 | 18 | | 0.00 | 0.00 | 0.01 | 0.00 | 0.00 | 0.07 | 0.00 | 0.00 | 0.02 | 0.37 |
| Component 4 | 14 | 10 | 1 | | 0.00 | 0.01 | 0.00 | 0.36 | 0.01 | 0.01 | 0.00 | 0.00 | 0.00 | 0.00 |
| Component 5 | 81 | 61 | 6 | | 0.00 | 0.01 | 0.00 | 0.00 | 0.05 | 0.10 | 0.00 | 0.07 | 0.01 | 0.01 |
| Component 6 | 345 | 264 | 35 | | 0.00 | 0.00 | 0.01 | 0.00 | 0.00 | 0.00 | 0.00 | 0.03 | 0.38 | 0.01 |
| Component 7 | 13 | 10 | 1 | | 0.05 | 0.00 | 0.31 | 0.07 | 0.30 | 0.02 | 0.06 | 0.65 | 0.00 | 0.04 |
| Component 8 | 101 | 87 | 10 | | 0.31 | 0.33 | 0.03 | 0.22 | 0.12 | 0.01 | 0.13 | 0.03 | 1.11 | 0.00 |
| Component 9 | 76 | 65 | 8 | | 0.10 | 0.13 | 1.41 | 0.07 | 0.08 | 0.05 | 0.08 | 0.09 | 0.01 | 0.54 |
| Component 10 | 311 | 259 | 34 | | 0.00 | 0.00 | 0.01 | 0.01 | 0.05 | 0.00 | 0.00 | 0.00 | 0.14 | 0.20 |
| Component 11 | 353 | 258 | 32 | | 0.01 | 0.00 | 0.00 | 0.00 | 0.14 | 0.05 | 0.00 | 0.03 | 0.00 | 0.01 |
| Component 12 | 331 | 253 | 26 | | 0.03 | 0.00 | 0.00 | 0.06 | 0.03 | 0.00 | 0.03 | 0.00 | 0.00 | 0.42 |
| Component 13 | 283 | 212 | 25 | | 0.00 | 0.01 | 0.00 | 0.00 | 0.08 | 0.00 | 0.00 | 0.00 | 0.00 | 0.01 |
| Component 14 | 347 | 257 | 31 | | 0.00 | 0.00 | 0.00 | 0.01 | 0.02 | 0.13 | 0.00 | 0.00 | 0.01 | 0.00 |
| Component 15 | 324 | 241 | 29 | | 0.00 | 0.00 | 0.03 | 0.00 | 0.00 | 0.00 | 0.00 | 0.00 | 0.00 | 0.15 |
| Component 16 | 367 | 261 | 35 | | 0.02 | 0.01 | 0.00 | 0.01 | 0.20 | 0.00 | 0.06 | 0.00 | 0.00 | 0.03 |
| Component 17 | 340 | 258 | 27 | | 0.00 | 0.00 | 0.01 | 0.00 | 0.04 | 0.01 | 0.03 | 0.00 | 0.00 | 0.00 |
| Component 18 | 175 | 131 | 15 | | 0.00 | 0.03 | 0.00 | 0.02 | 0.06 | 0.00 | 0.01 | 0.61 | 0.00 | 0.08 |
| Component 19 | 333 | 268 | 28 | | 0.00 | 0.00 | 0.00 | 0.00 | 0.00 | 0.00 | 0.00 | 0.00 | 0.00 | 0.00 |
| Component 20 | 270 | 218 | 23 | | 0.00 | 0.19 | 0.00 | 0.00 | 0.17 | 0.00 | 0.00 | 0.00 | 0.13 | 0.00 |
| Component 21 | 116 | 90 | 9 | | 0.01 | 0.00 | 0.00 | 0.00 | 0.00 | 0.00 | 0.00 | 0.00 | 0.00 | 0.00 |
| Component 22 | 384 | 270 | 39 | | 0.02 | 0.00 | 0.03 | 0.01 | 0.02 | 0.00 | 0.06 | 0.02 | 0.00 | 0.02 |
| Component 23 | 369 | 272 | 33 | | 0.00 | 0.00 | 0.01 | 0.00 | 0.20 | 0.01 | 0.03 | 0.00 | 0.00 | 0.00 |
| Component 24 | 268 | 195 | 25 | | 0.04 | 0.00 | 0.00 | 0.00 | 0.04 | 0.00 | 0.01 | 0.06 | 0.00 | 0.00 |
| Component 25 | 347 | 256 | 31 | | 0.00 | 0.00 | 0.00 | 0.00 | 0.00 | 0.01 | 0.00 | 0.00 | 0.00 | 0.08 |
| Component 26 | 354 | 255 | 33 | | 0.01 | 0.03 | 0.01 | 0.01 | 0.03 | 0.00 | 0.00 | 0.06 | 0.00 | 0.01 |
| Component 27 | 80 | 63 | 6 | | 0.00 | 0.03 | 0.01 | 0.06 | 0.03 | 0.00 | 0.00 | 0.00 | 0.00 | 0.00 |

Figure 2L

On Time Delivery Projections

| | | | | 1 | 2 | 3 | 4 | 5 | 6 | 7 | 8 | 9 | 10 |
|---|---|---|---|---|---|---|---|---|---|---|---|---|---|
| PN Count | | | | 1/20/2005 | 2/3/2005 | 2/17/2005 | 3/3/2005 | 3/17/2005 | 3/31/2005 | 4/14/2005 | 4/28/2005 | 5/12/2005 | 5/26/2005 |
| 761 | Final assembly planned date | | | | | | | | | | | | |
| | On time delivery target confidence | | | 95.0% | 95.0% | 95.0% | 95.0% | 95.0% | 95.0% | 95.0% | 95.0% | 95.0% | 95.0% |
| | Final assembly "can start" date with the above on time delivery target confidence | | | 4/12/2005 | 3/31/2005 | 3/24/2005 | 4/25/2005 | 4/26/2005 | 5/10/2005 | 6/2/2005 | 6/22/2005 | 6/22/2005 | 7/26/2005 |
| Component | Effective lead time (Inventory Policy) | Sample lead time mean | Sample lead time stdev | Delay (days) | Delay (days) | Delay (days) | Delay (days) | Delay (days) | Delay (days) | Delay (days) | Delay (days) | Delay (days) | Delay (days) |
| Component 1 | 282 | 282 | 33 | 83 | 56 | 36 | 53 | 44 | 40 | 50 | 55 | 41 | 62 |
| Component 2 | 81 | 64 | 7 | 6 | - | - | - | - | - | - | 5 | 6 | - |
| Component 3 | 195 | 153 | 18 | 20 | 13 | - | - | - | - | - | - | - | - |
| Component 4 | 74 | 10 | 1 | - | - | - | - | - | - | - | - | - | - |
| Component 5 | 81 | 61 | 6 | - | - | - | - | - | - | - | - | - | - |
| Component 6 | 345 | 264 | 35 | - | - | - | - | - | - | 30 | - | - | - |
| Component 7 | 13 | 10 | 1 | - | - | 1 | 1 | 1 | 1 | 1 | - | 0 | 1 |
| Component 8 | 101 | 87 | 10 | 8 | 18 | - | 7 | - | 11 | 8 | 5 | - | 9 |
| Component 9 | 76 | 65 | 8 | - | 12 | 6 | 1 | 2 | 9 | 2 | 6 | 9 | 12 |
| Component 10 | 311 | 259 | 34 | 28 | 13 | - | 32 | 30 | 34 | 30 | 29 | 24 | 7 |
| Component 11 | 353 | 258 | 32 | - | 5 | 3 | 25 | - | - | - | - | - | - |
| Component 12 | 331 | 253 | 26 | - | 21 | - | - | - | - | - | - | - | - |
| Component 13 | 283 | 212 | 25 | - | 3 | - | 11 | - | - | 2 | - | - | - |
| Component 14 | 347 | 257 | 31 | 9 | - | 3 | 4 | 6 | - | 0 | - | - | - |
| Component 15 | 324 | 241 | 29 | 2 | 7 | - | - | - | - | 17 | - | - | - |
| Component 16 | 367 | 261 | 35 | - | - | - | - | - | 25 | 21 | - | - | - |
| Component 17 | 340 | 258 | 27 | 31 | - | 12 | 9 | - | - | 19 | 24 | 27 | - |
| Component 18 | 175 | 131 | 15 | - | - | - | - | - | - | - | - | - | - |
| Component 19 | 333 | 268 | 28 | - | - | - | - | - | - | - | - | - | 2 |
| Component 20 | 270 | 218 | 23 | - | 3 | - | 8 | - | - | - | - | - | - |
| Component 21 | 116 | 90 | 9 | - | - | - | - | - | - | - | - | - | - |
| Component 22 | 384 | 270 | 39 | - | - | - | - | - | - | - | - | - | - |
| Component 23 | 369 | 272 | 33 | - | - | 11 | - | - | - | - | - | - | 11 |
| Component 24 | 268 | 195 | 25 | - | 8 | - | - | - | - | - | - | - | - |
| Component 25 | 347 | 256 | 31 | - | - | - | - | - | - | - | - | - | 25 |
| Component 26 | 354 | 255 | 33 | - | - | - | - | - | 4 | - | 2 | - | - |
| Component 27 | 80 | 63 | 6 | 7 | - | - | - | - | - | - | - | - | - |

*Figure 2M*

| Return to architecture >> | What-if Analysis | | Unit | | | | | | | | | | |
|---|---|---|---|---|---|---|---|---|---|---|---|---|---|
| | | | Date of final Assembly | 20-Feb-05 | 6-Mar-05 | 20-Mar-05 | 3-Apr-05 | 17-Apr-05 | 1-May-05 | 15-May-05 | 29-May-05 | 12-Jun-05 | 26-Jun-05 |
| | | | Updated Date of Final Assembly | 20-Feb-05 | 6-Mar-05 | 20-Mar-05 | 3-Apr-05 | 17-Apr-05 | 1-May-05 | 15-May-05 | 29-May-05 | 12-Jun-05 | 26-Jun-05 |
| | Target change in mean lead time | Target change in lead time availability | Net supply delay to assembly (days) | 3.07 | 0.72 | 1.30 | 1.23 | 0.85 | 0.88 | 2.62 | 1.04 | 1.27 | 4.75 |
| | -10% | 0% | Probability of on time assembly start | 32% | 83% | 71% | 85% | 78% | 84% | 79% | 88% | 78% | 74% |
| Component | Effective lead time (Inventory Policy) | Sample lead time mean | Sample lead time stdev | Order Status Days Early (Late) | Order Status Days Early (Late) | Order Status Days Early (Late) | Order Status Days Early (Late) | Order Status Days Early (Late) | Order Status Days Early (Late) | Order Status Days Early (Late) | Order Status Days Early (Late) | Order Status Days Early (Late) | Order Status Days Early (Late) |
| Component 1 | 374 | 295 | 52 | 4 | 21 | 2 | 26 | 31 | 11 | (14) | 41 | 3 | 34 |
| Component 2 | 90 | 65 | 11 | 6 | 2 | 10 | 2 | 4 | 2 | 4 | 14 | 11 | 2 |
| Component 3 | 184 | 149 | 21 | (20) | 12 | 26 | 36 | (3) | 3 | (1) | 23 | 1 | 6 |
| Component 4 | 16 | 10 | 2 | 1 | 1 | 1 | (1) | 0 | 1 | 7 | 2 | 2 | 2 |
| Component 5 | 92 | 63 | 11 | (20) | 7 | 10 | 4 | 6 | 8 | 17 | 12 | 3 | 1 |
| Component 6 | 637 | 260 | 45 | 20 | 74 | 15 | 63 | 69 | (0) | 41 | 56 | 36 | 35 |
| Component 7 | 26 | 10 | 2 | 3 | (2) | (2) | (0) | 2 | 1 | 0 | (1) | 0 | 3 |
| Component 8 | 107 | 77 | 14 | 0 | 5 | 2 | (4) | (1) | 5 | 8 | 9 | 12 | 9 |
| Component 9 | 84 | 66 | 12 | (20) | 2 | (5) | 8 | 11 | 15 | 4 | 6 | (2) | 15 |
| Component 10 | 342 | 264 | 51 | 20 | 4 | 8 | 27 | 48 | 32 | 45 | 7 | 26 | 29 |
| Component 11 | 392 | 263 | 53 | (20) | (23) | 15 | 16 | 41 | (9) | 44 | (15) | 12 | 54 |
| Component 12 | 446 | 281 | 46 | 66 | 40 | (3) | 13 | 32 | (6) | 25 | (21) | (3) | (22) |
| Component 13 | 340 | 218 | 40 | 57 | 43 | 62 | 18 | 5 | 15 | 9 | (6) | 7 | 46 |
| Component 14 | 388 | 238 | 46 | 63 | 41 | 33 | 45 | 47 | 4 | (24) | 51 | (18) | 32 |
| Component 15 | 390 | 268 | 43 | 20 | 9 | 26 | 44 | 26 | 44 | (34) | 5 | (14) | 3 |
| Component 16 | 424 | 255 | 43 | 61 | 52 | 22 | 5 | 3 | 34 | 13 | 32 | 36 | 38 |
| Component 17 | 419 | 254 | 55 | 17 | (18) | 49 | 17 | 17 | 22 | 48 | (13) | 27 | (6) |
| Component 18 | 208 | 127 | 25 | (20) | 22 | (4) | 20 | 24 | 25 | 11 | (13) | 20 | 19 |
| Component 19 | 720 | 269 | 56 | 38 | 88 | 72 | 102 | 25 | 29 | 89 | 31 | 102 | 50 |
| Component 20 | 526 | 216 | 47 | (20) | 33 | 36 | 9 | 1 | (20) | 84 | (1) | (7) | 68 |
| Component 21 | 135 | 84 | 14 | (20) | 13 | (3) | 11 | 23 | (9) | 2 | 1 | 5 | 8 |
| Component 22 | 410 | 288 | 52 | 43 | (4) | 11 | 21 | 14 | (24) | (5) | 58 | (8) | 8 |
| Component 23 | 409 | 264 | 57 | 11 | 60 | 19 | 60 | (10) | 19 | 11 | 49 | 40 | 39 |
| Component 24 | 312 | 198 | 40 | (20) | (3) | 23 | (1) | 33 | (12) | 7 | (19) | 20 | 12 |
| Component 25 | 325 | 243 | 50 | 3 | 40 | (4) | (3) | 14 | 33 | 34 | 23 | 46 | (36) |
| Component 26 | 422 | 247 | 53 | (20) | 34 | 20 | (31) | (10) | 22 | 6 | (26) | 46 | 11 |
| Component 27 | 101 | 60 | 11 | (20) | 4 | 16 | 10 | (8) | 6 | 12 | 2 | 10 | 2 |

*Figure 2N*

SYSTEM AND PROCESS FOR SUPPLY MANAGEMENT FOR THE ASSEMBLY OF EXPENSIVE PRODUCTS

CROSS REFERENCE TO RELATED APPLICATION

This application is a continuation of parent application Ser. No. 11/434,283 now U.S. Pat. No. 7,418,307 May 16, 2006 which is incorporated herein by reference.

BACKGROUND OF THE INVENTION

1. Field of the Invention

The present invention generally relates to supply management, and in particular to techniques for optimizing supply management for the assembly of expensive products.

2. Background Description

There are numerous prior art methods and systems that manage inventory. Since inventory problems can show substantial variations depending on the industry, process, supply network, and product characteristics, there is a proliferation of academic publications as well as patents covering inventory management.

U.S. Pat. No. 7,016,764 to Penkar et al., "Inventory management system for reducing overall warehouse and pipeline inventory" discloses an inventory management system for warehouse and pipeline inventory. The system is designed to provide regular shipments of parts to multiple manufacturing facilities from a hub via an expedited delivery service. The objective of the design is to reduce the amount of safety stock needed to support the operations of the manufacturing facilities.

U.S. Pat. No. 6,983,189 to Lu, "Systems and methods for manufacturing a product in a pull and push manufacturing system and associated methods and computer program products for modeling the same" has a system of manufacturing a product in a pull and push planning environment where products consist of multiple subassemblies which have multiple components. The system includes an order scheduler, a component scheduler, a make-to-order (MTO) portion and an assemble to order (ATO) portion. This is done for multi-plant systems.

U.S. Pat. No. 6,970,756 to Levionnois, "Computer-assisted pull flow production management method" discloses a method to manage component inventory using kanbans.

U.S. Pat. No. 6,594,535 to Costanza, "Material and inventory control system for a demand flow process" discloses a material flow design computer system that designs and monitors material to the production paths of a manufacturing line using a replenishment card pull sequence. Its objective is to monitor the product flow through replenishment pull sequence so as to insure that material arrives as needed at the point-of-usage on the production path and that the quantity of material stored at the manufacturing plant is minimized.

U.S. Pat. No. 6,516,301 to Aykin, "Order-based material management system" has an order based materials management method using forecasts of actual customer orders to determine component stocking levels. Orders are specified by bills of materials. Quantities of the components required in the bill of material have multivariate probability distributions and they can be correlated. The method calculates target number of replenishment orders for components using target order fill rate, replenishment lead times, demand forecasts, forecast error variances and their distributions. The method also calculates order-up-to periodic inventory policies (including safety stocks) for components and subassemblies.

U.S. Pat. No. 5,963,920 to Rose et al., "Inventory control system and method", discloses a method and system for managing inventory of bulk commodities from a remote location. A rack storage unit at the point of use of the parts has multiple levels each having side by side rows for storing boxes of the parts. The rows are inclined downwardly from back to front to effect gravity feeding of the boxes toward the front. Each row has plural sites which may be occupied by a box, and a sensor senses whether a box is present at or absent from each site. Electrical signals from the sensors are processed and transmitted to the parts supplier at a remote location. The supplier receives a display containing information as to which sites are occupied and which are vacant. The supplier can respond by shipping parts that are indicated to be in short supply.

U.S. Pat. No. 5,946,662 to Ettl et al., "Method for providing inventory optimization", discloses a method for providing inventory optimization for levels of products in a complex supply chain network for multiple internal suppliers or manufacturer locations and external distributors or retailer locations. The invention constructs a representative supply chain network model to indicate the flow of products between internal and external locations, it determines inventory levels and fill rates to meet the service level requirements, calculates a total inventory cost for all products in the network, and optimizes the fill rates.

U.S. Pat. No. 5,630,070 to Dietrich et al., "Optimization of manufacturing resource planning", discloses a method for constrained material requirements planning, optimal resource allocation, and production planning provides for an optimization of a manufacturing process by designating the amounts of various manufactured products to be produced, which products include both end products as well as subassemblies to be employed in the manufacture of one or more of the end products. In order to accomplish the optimization, the method employs an objective function such as the maximization of income. In the method, the data describing elemental steps in the manufacturing process for the production of each end product, as well as the quantity or demand for each end product which is to be supplied, are presented as a set of linear mathematical relationships in matrix form to be inserted in a computer which determines the optimum number of each end product in accordance with an LP optimization algorithm. The matrix contains bill of material data, and various constraints.

U.S. Pat. No. 6,415,266 to Do, "Dynamic instruction system for input of parts in vehicle production line", discloses a dynamic instruction system for the input of parts in a vehicle production line which, based on vehicle type information at each process as well as dynamic production plans, performs computations on a variety of data in order to provide parts input information to both equipment in the production line and to workers such that parts can be provided as they are needed. The system is claimed to prevent the presence of defective parts at processes in the production line and in a parts storage area, and to provide optimum stock levels such that capacity utilization and productivity are enhanced.

U.S. Pat. No. 5,819,232 to Shipman, "Method and apparatus for inventory control of a manufacturing or distribution process", discloses a method and an apparatus, using a computer model, to control a manufacturing or distribution process, which determines a demand forecast by using an optimized historical weighting factor, determines an upper and a lower bound of a planned inventory by explicitly accounting for the customer order lead time, and computes a production schedule at predetermined intervals to maintain an actual inventory between the upper and lower bounds of the planned inventory.

U.S. Pat. No. 5,611,051 to Pirelli, "Point of supply use distribution process and apparatus", discloses a method of using a central computer and work station for managing inventory. To dispense inventory to consumers, a system user is issued a card imprinted with a personal user bar code. This user bar code is read into the computer and subsequently verified through the entry of individual user access data to ensure the user is authorized. The issued-item data is communicated to a central computer, where the issued item is decremented from inventory data. The central computer determines when and in what quantity to replenish each item from the inventory data. A replenishment order is processed by the central computer, and the replenishment order is transmitted to a vendor.

U.S. Pat. No. 5,287,267 to Jayaraman et al., "Methods for parts procurement quantity determination where demand is uncertain for the product in which the parts are used", discloses a method for predicting parts procurement requirements for products over multiple time periods, with parts common to multiple products. The actual demand for the products is uncertain, but the method assures that a specified service level is met for all products and minimizes expected excess part inventories. The method is provided with inputs, which, among others, includes lists of parts for each product, prices for the parts, and demand forecasts for each product in each time period, each forecast in the form of a mean and standard deviation. The description of the problem includes an objective function of minimizing expected excess inventory while satisfying the constraint that a specified service level be achieved. Solution is provided using Lagrange multiplier technique. Additional methods are described for improving the procurement decisions to more closely meet the service requirement.

In all of the above patents (with the exception of U.S. Pat. No. 6,983,189, which is discussed in the next paragraph) the methods disclosed are for managing inventory volumes to support some manufacturing or distribution activity. Managing inventory volumes means using policies such as base-stock levels, lot size or order-up-to levels. Such methods are quantity driven. In other words, they trigger replenishment orders when inventory levels drop to a threshold quantity. They are appropriate methods when usages of components, products or parts are at high volumes. However, quantity-based inventory policies do not perform well for scheduling manufacturing assembly of complex products, simply because they do not allow triggering replenishment orders at any point in time; they trigger orders only if inventory levels drop to a threshold level. For instance, if a component is needed once every 2 months, quantity-based policies will wait an average of 2 months to trigger an order while it might be better to time the order more accurately sometime within the 2 month period. Furthermore, when there are thousands of components that have to come together to perform an assembly, the quantity-based safety stocks can be prohibitively high. For instance, consider a complex product that needs a thousand different types of components for its assembly. If the assembly has to start on time with 99% probability and supply lead times for components are uncertain, then each component has to have a safety factor of at least 4.25. This requires extremely high levels of component inventories and therefore may be too costly. In such cases, there is a need for a fundamentally different method to managing inventory.

U.S. Pat. No. 6,983,189 is an exception to the others mentioned above. It generates order schedules. Generating some kind of supply order schedule is not new. There are procurement systems that suggest order times. For instance, standard MRP (Material Requirements Planning) also schedules component orders but ignores the impact of uncertainty in lead times. Furthermore, MRP is quantity based (i.e. schedules orders of lots), and it does not focus on the best time to trigger an order for an individual part when managing a low volume manufacturing environment.

What is needed is a method for effectively managing supply for products that are expensive to assemble such as aircraft, heavy equipment and machinery. Supply inventory management of such products needs a different approach than those described in the prior art. Known techniques that are implemented in commercially available software are not adequate. Known techniques are designed for high volume products that tend to be less expensive and typically sell in hundreds or thousands in weekly volume.

However, for highly expensive items such as aircraft or heavy machinery, weekly volumes for each model or part number tend to be much smaller. Even the largest manufacturers make just a few items per week. In addition, due to product complexity, there are tens of thousands of components that have to be supplied to do the manufacturing. Furthermore, replenishment lead times for these components are uncertain. Therefore, management of component supply needs a different approach for such products. The challenge is twofold: 1) how to make sure that random variation in supply replenishment lead times does not disrupt the manufacturing activity due to supply shortages, and 2) how to minimize supply safety stock so that supply inventory turns are maximized.

In general, these two objectives are in conflict for any inventory management problem. For expensive items, the problem is particularly challenging. On the one hand, because expensive items tend to have an expensive manufacturing operation, maximizing manufacturing line utilization is an important goal. Therefore, supply must be available at very high levels of confidence. On the other hand, because tens of thousands of components must to be available simultaneously, each component must have extremely high levels of availability to support smooth operations of the manufacturing line. When random variation of supply replenishment lead times is added to this statement of the problem, one is required under conventional safety stock management methods to hold very high levels of component supply. But this is prohibitively expensive for a product which must be assembled from a very large number of component parts. An efficient process needs to be put in place in order to manage supply inventories at reasonable levels and still achieve smooth manufacturing operations for such products.

SUMMARY OF THE INVENTION

It is therefore an object of the present invention to provide a system and process which manages supply inventories at reasonable levels while still achieving smooth manufacturing operations.

Another object of the invention is to maximize manufacturing line utilization for the assembly of expensive products by assuring very high levels of confidence in the availability of component supplies.

A further object of the invention is to minimize safety stock levels so that inventory turns are maximized.

It is also an object of the invention to accommodate uncertainties in supply replenishment lead times for component supplies while at the same time keeping inventories at reasonable levels.

The invention accomplishes these objectives by generating order timing through a fundamentally different and novel process. The method of the present invention takes into account uncertainty in supply lead times and calculates the best time for triggering each order for each component in relation to other components, their inventory carrying costs, and on time assembly start target probability. When followed, the method of the present invention can achieve on time assembly start performance (in a statistical sense) with minimum possible component inventory carrying costs.

The present invention operates by carefully monitoring and managing the on-time delivery performance of component suppliers. Acceptable on-time delivery performance targets are calculated, along with tolerances for delay in shipment. These are communicated to suppliers, and the performance of suppliers against these targets is monitored closely. Based on these monitored supplier performance levels and scheduled manufacturing due dates, the invention triggers supply orders at optimal times so that supply inventory is minimized and supply shortages are avoided.

Furthermore, the invention provides projections of assembly delays and "can-deliver" dates in response to changes in supply lead time performance, and these projections can be used by managers to seek improved delivery times from suppliers.

An aspect of the invention is a system for managing component supply for assembly of complex products. The system comprises a monitoring engine for prompting improved supply lead time performance of suppliers of components of a complex assembly, and an optimization engine for using the improved supply lead time performance to generate supply order times that keep an expected supply delay for a component within a target delay tolerance for the component.

In another aspect of the invention, the monitoring engine further comprises, for each component, means for measuring an historical record of delivery delay by the supplier, means for obtaining from the supplier at periodic intervals an estimated delivery delay for each component item in a delivery pipeline, and means for calculating in a delivery pipeline an improvement factor that compares the estimated delivery delay with the historical delivery delay.

In a further aspect of the invention, the optimization engine further comprises means for selecting for each component an inventory policy for determining a safety factor for the component, means for calculating a safety factor for each component in accordance with the selected inventory policy, means for determining a target delay tolerance for each component, means for calculating an expected supply delay for each component, and means for calculating the supply order time for each component so that the expected supply delay is within said target delay tolerance.

Another aspect of the invention provides means for presenting to a manager projections of an effect of an unexpected supply delay for a component upon an assembly schedule for the complex assembly, and means for the manager to request from a supplier of the component faster delivery of the component in response to the projection.

BRIEF DESCRIPTION OF THE DRAWINGS

The foregoing and other objects, aspects and advantages will be better understood from the following detailed description of a preferred embodiment of the invention with reference to the drawings, in which:

FIG. 2A is a table (Table 136) illustrating exemplary purchase order data for a system implementing the invention.

FIG. 2B is a table (Table 134) illustrating exemplary supply lead time data for a system implementing the invention.

FIG. 2C is a table (Table 132) illustrating exemplary supply lead time statistics for a system implementing the invention.

FIG. 2D is a table (Table 112) illustrating exemplary supplier performance data for a system implementing the invention.

FIG. 2F is a table (Table 140) illustrating exemplary component cost data for a system implementing the invention.

FIG. 2G is a table (Table 138) illustrating exemplary supply order status data for a system implementing the invention.

FIG. 2H is a table (Table 142) illustrating exemplary inventory policy type data for a system implementing the invention.

FIG. 2J is a table (Table 122) illustrating exemplary optimal supply order times data for a system implementing the invention.

FIG. 2K is a table (Table 152) illustrating exemplary supply order schedule data for a system implementing the invention.

FIG. 2L is a table (Table 124) illustrating exemplary assembly delay projection data for a system implementing the invention.

FIG. 2M is a table (Table 126) illustrating exemplary "can-deliver" dates data for a system implementing the invention.

FIG. 2N is a table (Table 128) illustrating exemplary what-if analysis data for a system implementing the invention.

DETAILED DESCRIPTION OF A PREFERRED EMBODIMENT OF THE INVENTION

Supply inventory management for the assembly of complex products presents challenges that are not adequately addressed by conventional techniques. These challenges may be understood by reference to the following attributes characteristic of such assemblies. First, these products and their manufacturing operations are expensive. Therefore, there is a premium on efficient utilization of the manufacturing line. Second, while the volume of product produced in the manufacturing line is relatively low, the number of components may be quite large and vary widely in price. Third, supply lead times between order and delivery not only vary widely from component to component but have a degree of uncertainty for any given component. This makes it difficult to assure that component supplies are always available for the manufacturing line and, at the same time, to minimize safety stock levels.

The key to managing supply inventory in an environment as described above is to manage on time delivery performance of the suppliers. In order to do this, the manufacturer needs to calculate acceptable on time delivery performance targets and shipment delay tolerance levels. These targets need to be communicated to the suppliers, and the performance of the suppliers needs to be monitored very closely against these targets. In addition, based on supplier performance levels, and scheduled manufacturing due dates, the manufacturer needs to trigger supply orders at optimal times so that two objectives are met simultaneously: supply inventory is minimized, and supply shortages are avoided.

This invention describes how to both set performance targets and monitor optimal supply timing through a process that manufacturers can use to maintain high supply availability with minimal possible supply inventory. The method consists of the following elements: 1) a process of setting supply delivery performance targets for each supplier; 2) a process of monitoring and managing supply delivery performance for each supplier; 3) a process of optimizing safety stock for each component; and 4) a process of estimating supply shortage probabilities, amount of manufacturing delays due to component shortages and the chances of being able to start/complete manufacturing on a given date.

Figure 1:
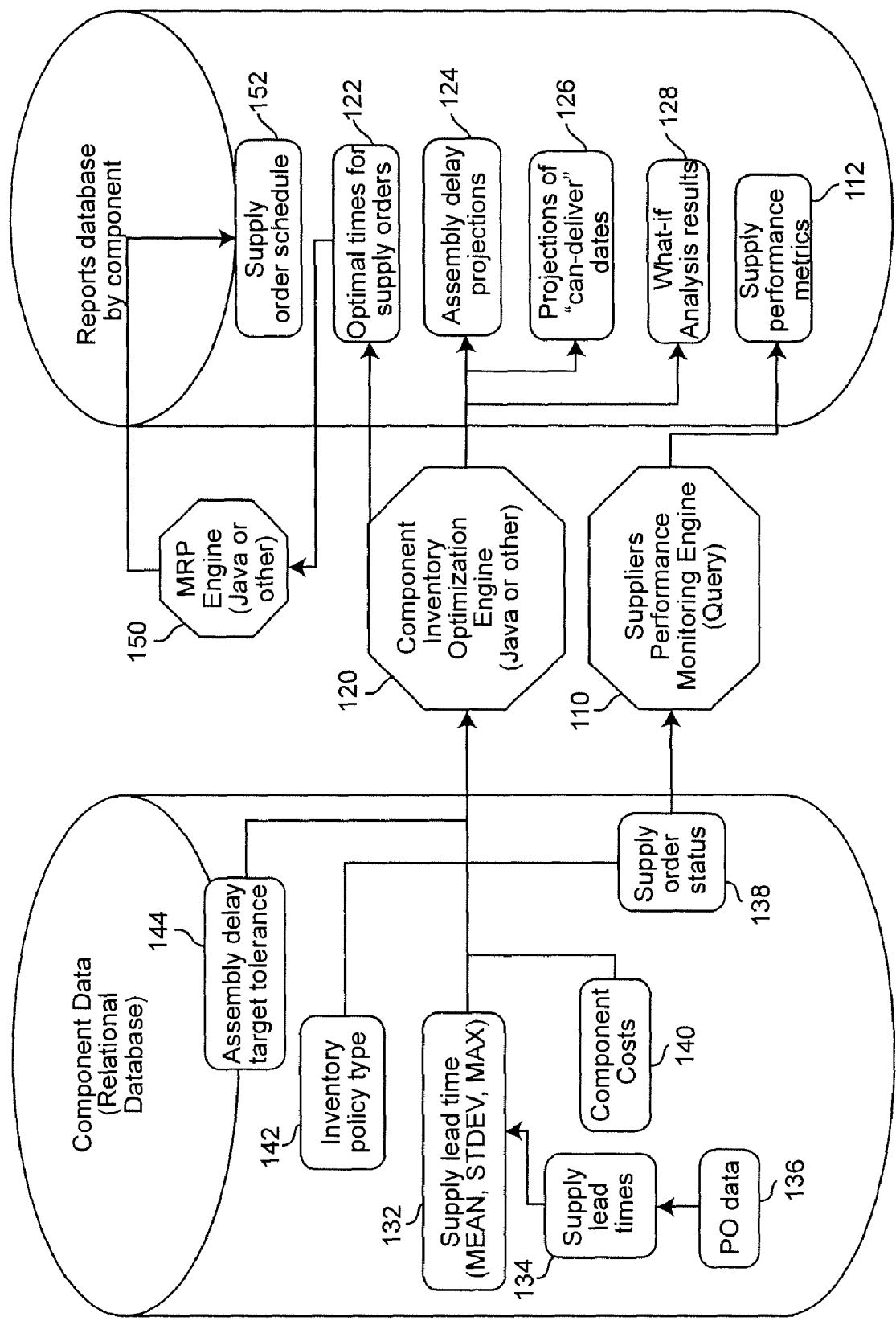
FIG. 1 is a schematic diagram showing a high level architecture for a system implementing the invention.

The invention has two parts to it, as shown in FIG. 1, which is a system implementing the invention. The first part is a supplier performance monitoring engine 110. The second part is a component inventory optimization engine 120. The supplier performance monitoring engine 110 allows setting business rules between suppliers and the manufacturer. These include tolerance levels for supply delays, on time delivery performance targets, etc. Each supplier is monitored closely for their performance to these targets. Their performance is recorded and regular performance statistics are generated. If targets are not met, alerts are created and implications in terms of supply availability and manufacturing delays are reported. The component inventory optimization engine 120 calculates optimal times 122 to place supply orders for each component (which is in turn used by a conventional Material Requirements Planning (MRP) engine 150 to provide a supply ordering schedule 152).

Figure 1A:
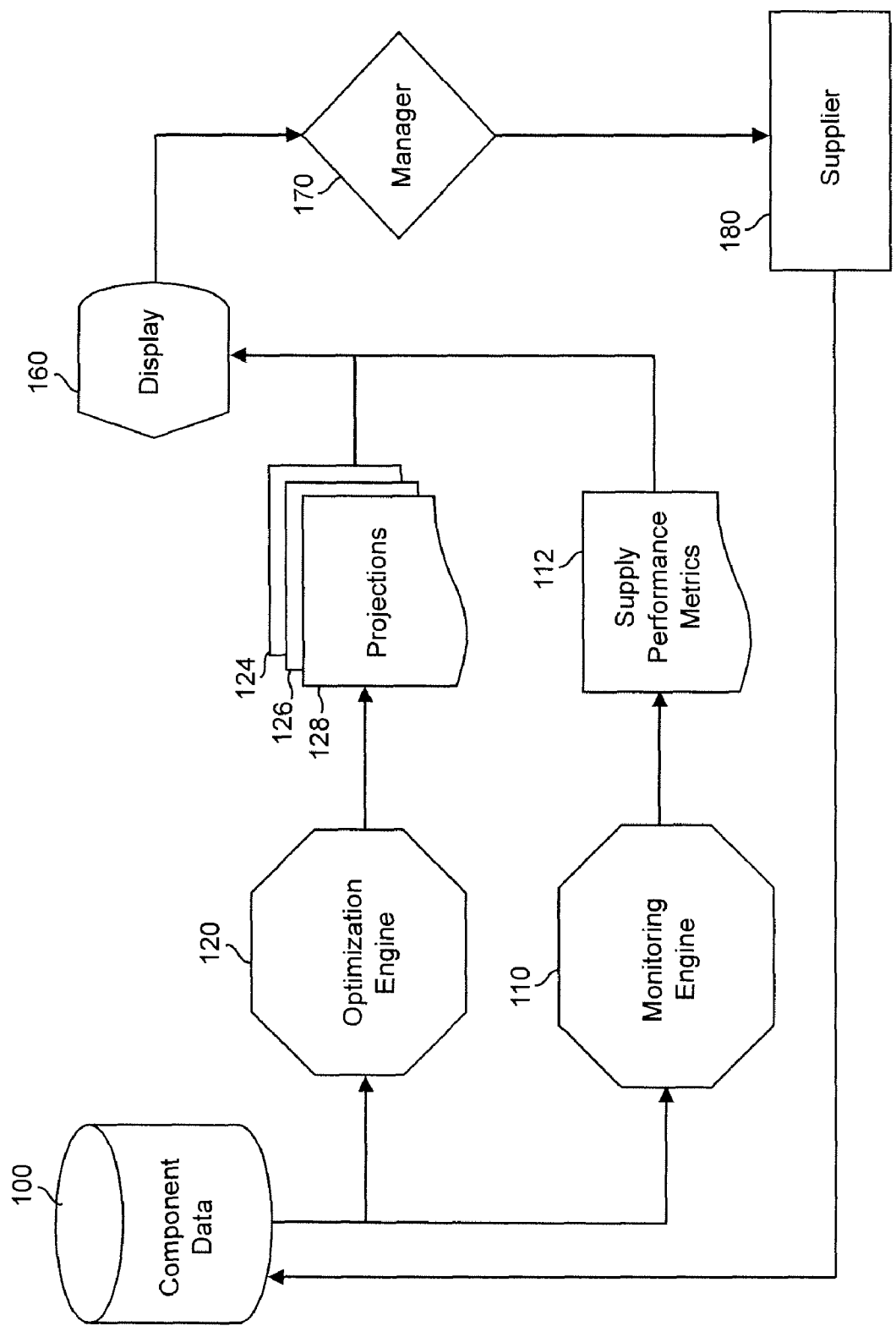
FIG. 1A is a schematic diagram showing a portion of the architecture providing system information support for managing suppliers.

The optimization engine 120 also computes a projection of product assembly delays 124 and "can-deliver" dates 126, as well as performing a "what-if" analysis 128 of scenarios based on alternative assumptions. These calculations are useful for business operations. Although optimal order times are the key to managing performance, operational metrics such as "can-deliver" dates and "assembly-delays" can vary because of uncertainties that cannot be predicted or resolved. These real world uncertainties can be modeled as random variations (as is done with the model shown in FIGS. 2A through 2N), but managers must respond to these uncertainties as they arise. Since these uncertainties have an effect on "can-deliver" dates, "assembly-delays" and other operational metrics, it is helpful to report projections of these metrics to the business decision makers so that they can take actions to make improvements. This is shown in FIG. 1A, where projections 124, 126 and 128 are presented at display 160 so that manager 170 can contact supplier 180 to provide improved delivery, which is then reported back as updated supply order status 138 in component data 100.

For instance, if can-delivery dates are not acceptable due to excessive supply delays, they can call the suppliers to request faster delivery. The system reports projected delays for each component and hence enables managers of operations to identify which supplier to call to shorten or eliminate the assembly delays 138 (see FIG. 2G).

The optimization provided by engine 120 is based on a variety of factors, including supply lead time statistics 132 (computed from supply lead times 134, in turn computed from historical purchase order data 136), supply order status 138 and component costs 140. The type of inventory policy 142 for the component also enters into the optimization calculation, as does an assessment by product managers of target tolerances for assembly delay 144. The engine 120 calculates the optimal times 122 of advance supply orders in order to minimize supply inventory and maximize supply availability, as described below.

The following notations will be used in further describing the workings of the system shown in FIG. 1 for implementing the invention:

J[i]: Total number of historical supply orders for component i.

I[k]: Number of different components needed for assembly process k.

i: Index representing components (i=1, . . . , I[k])

j: Index representing orders (j=1, . . . , J[i])

k: Index representing assembly processes (k=1, . . . , K)

DSO[i,j]: Date when the supply order is placed for component i and order j.

DSR[i,j]: Date when the supply is received for component i and order j.

EDSR[i,j]: Estimated date of supply order arrival for component i and order j.

COST[i]: Cost per unit of component i.

There are three groups of statistics based on lead time: historical, current and improvement.

HSLT[i,j]: Historical supply lead time for component i and order j.

HASLT[i]: Historical average supply lead time for component i.

HSSLT[i]: Historical standard deviation of supply lead time for component i.

HMINSLT[i]: Historical minimum supply lead time for component i.

HMAXSLT[i]: Historical maximum supply lead time for component i.

CSLT[i,k]: Supply lead time for component i and assembly k.

CASLT[i]: Current average supply lead time for component i.

CSSLT[i]: Current standard deviation of supply lead time for component i.

CMINSLT[i]: Current minimum supply lead time for component i.

CMAXSLT[i]: Current maximum supply lead time for component i.

IASLT[i]: Improvement in supply lead time for component i.

ISSLT[i]: Improvement in standard deviation of supply lead time for component i.

IMINSLT[i]: Improvement in minimum supply lead time for component i.

IMAXSLT[i]: Improvement in supply lead time for component i.

The following notations apply to inventory policy and the safety factors applicable to each policy.

POLICY[i]: Inventory policy type for component i.

OSFACTOR[i]: Optimal safety factor for timing the supply order for component [i].

FSFACTOR[i]: Fixed safety factor for timing the supply order for component [i].

ASFACTOR[i]: Availability target based safety factor for timing the supply order for component [i].

WSFACTOR[i]: Worst case safety factor for timing the supply order for component [i].

SFACTOR[i]: Safety factor to be used in calculating the safety lead time for component i.

The following notations apply to lead time calculations.

SLTIME[i]: Safety lead time for component [i].

OLTIME[i]: Optimal supply order lead time for component i.

OOTIME[i,k]: Optimal order time (date) for component i to be used in product k.

ATARGET[i]: Availability probability target for component i.

DTARGET[i]: Supply delay target (tolerance) for component i.

ESDP[i,k]: Expected supply delay for component i and assembly k beyond planned assembly date.

ESDR[i,k]: Expected supply delay for component i and assembly k beyond requested assembly date.

SSD[i,k]: Status of supply delay given by the supplier for component i and assembly k.

JSD[i,k]: Net supply delay of component i for assembly k for joint component availability target of CLEVEL[k].

TESDP[k]: Total estimated supply delay for assembling process k (in days) beyond planned assembly date.

TESDR[k]: Total estimated supply delay for assembling process k (in days) beyond requested assembly date.

PSTART[k]: Date of planned final assembly process k.

RSTART[k]: Date of requested final assembly for process k.

CLEVEL[k]: On time assembly confidence level for assembly process k. It is also the target probability of on time start of assembly process k (i.e. joint availability probability of all components for process k so that process k can start at the planned start date).

CSTART[k]: "Can start" date of assembly process k with confidence level CLEVEL[k].

ASLTCHANGE[i]: Change (in percentages) in average supply lead time for component i.

SSLTCHANGE[i]: Change (in percentages) in standard deviation of supply lead time for component i.

PONTIMEA[k]: Probability of on time start of assembly process k.

PONTIMEC[k]: Probability of on time arrival of component i for assembly k.

In the mathematical formulas that follow, the superscript "$2$" means the square of the number to which it is applied. Similarly, the superscript "$1/2$" means the square-root of the number to which it is applied. The brackets "(", ")" are used in proper mathematical sense and they determine the priority of calculations. Furthermore, the standard convention is adopted to prioritize algebraic operations addition "+" and multiplication "*". That is, operations "*" and "/" take precedence over operations "+" and "−" when they are not separated by "(", and ")".

Some common functions used are also defined as follows:

cdfstdnormal(x) is the cumulative probability distribution function of standard normal random variable evaluated at x.

pdfstdnormal(x) is the probability density function of standard normal random variable evaluated at x.

invcdfnormal(x,y,z) is the inverse cumulative probability distribution function of a normal random variable with mean y and standard deviation z evaluated at x.

product(x1, x2, . . . , xn)=x1*x2* . . . *xn (i.e. the multiplication of x1 through xn).

sqrt(x) gives the square-root of x.

sum(x1, x2, . . . , xn)=x1+x2+ . . . +xn (i.e. the sum of x1 through xn).

min(x1, x2, . . . , xn) gives the minimum of x1, x2, . . . , xn.

max(x1, x2, . . . , xn) gives the maximum of x1, x2, . . . , xn.

Purchase Order (PO) Data 136

Purchase order data consists of historical supply orders and related information. These are DSO[i,j] (date when the supply order is placed for component i and order j) and DSR[i,j] (date when the supply is received for component i and order j).

This data can be accessed from a database or a flat file. The data are used to calculate the lead time statistics.

Table 136 shown in FIG. 2A illustrates exemplary purchase order data.

Supply Lead Times 134

Historical purchase order data of supply orders are used to calculate the historical supply lead times for each component i as follows:

HSLT[i,j]=DSR[i,j]−DSO[i,j] for all j=1,2, . . . , J[i]

Table 134 shown in FIG. 2B illustrates exemplary supply lead time data.

Supply Lead Time Statistics 132

Historical supply lead time performance for each component can be summarized in terms of mean, standard deviation, minimum and maximum of historical observations. These statistics are calculated as follows:

HASLT[i]=(1/J[i])*sum(HSLT[i,j] for all j=1,2, . . . , J[i])

HSSLT[i]=sqrt((sum(HSLT[i,j]$^2$ for all j=1,2, . . . , J[i])−J[i]*sum(HSLT[i,j] for all j=1,2, . . . , J[i])/(J[i]−1))

HMINSLT[i]=min(HSLT[i,j] for all j=1,2, . . . , J[i])

HMAXSLT[i]=max(HSLT[i,j] for all j=1,2, . . . , J[i])

Table 132 shown in FIG. 2C illustrates exemplary supply lead time statistics.

Supplier Performance 112

The current projections of supply lead time performance are based on the pipeline orders. The process allows each supplier to update the supply order status of each order (i.e. the delay or early delivery of each outstanding order against the original request date). The order status for component i to be used in assembly k is an input and its value in the system is updated by the supplier. This input is represented by ESDP[i,k]. Based on this, we calculate the current supply lead time projection for component i in the pipeline to be used for scheduled assembly process k as follows:

CSLT[i,k]=HASLT[i]+ESDP[i,k]

Based on this, we calculate the projected supply lead time performance statistics as follows:

CASLT[i]=(1/K[i])*sum(CSLT[i,k] for all k=1,2, . . . , K[i])

CSSLT[i]=sqrt((sum(CSLT[i,k]$^2$ for all k=1,2, . . . , K[i])−K[i]*sum(CSLT[i,k] for all k=1,2, . . . , K[i]))/(K[i]−1))

CMINSLT[i]=min(CSLT[i,k] for all k=1,2, . . . , K[i])

CMAXSLT[i]=max(CSLT[i,k] for all k=1,2, . . . , K[i])

Based on historical supply lead time performance and projected supply lead time performance, we calculate the improvement in supply lead time performance as follows:

IASLT[i]=(HASLT[i]−CASLT[i])/HASLT[i]

ISSLT[i]=(HSSLT[i]−CSSLT[i])/HSSLT[i]

IMINSLT[i]=(HMINSLT[i]−CMINSLT[i])/HMINSLT[i]

IMAXSLT[i]=(HMAXSLT[i]−CMINSLT[i])/HMAXSLT[i]

Table 112 shown in FIG. 2D illustrates exemplary supplier performance data. This data provides guidance to operations managers for ensuring that suppliers perform in accordance with the agreements. If a supplier's delivery performance is poorer than the agreements, this report allows detection so that operations managers can contact the supplier requesting better performance. Since the most recent supplier lead time statistics data 132 will also reflect this recent poor performance, when the component inventory optimization engine 120 calculates updated optimal times for supply orders 122, it takes into account this poor performance and hence recommends earlier placement or orders with this particular supplier. Similarly, it recommends later placement of orders if the supplier performance has improved.

Assembly Delay Target Tolerance 144

Optimal supply order times depend on how much delay in supply arrival can be tolerated. For each component, a target delay is specified. This target delay is an input to the calculations. If the user chooses to optimize the supply order times, then optimal safety lead times are calculated so as to bring expected supply delay for each component below the target delay specified for that component. For component i, we denote target delay by DTARGET[i].

Figure 2E:
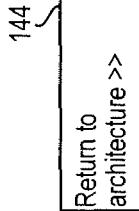
FIG. 2E is a table (Table 144) illustrating exemplary assembly delay target tolerance data for a system implementing the invention.

Table 144 shown in FIG. 2E illustrates exemplary assembly delay target tolerance data.

Component Costs 140

Component costs are essential to the minimization of inventory costs. These costs are user inputs to the system. We will denote the cost per unit for component i by COST[i].

Table 140 shown in FIG. 2F illustrates exemplary component cost data.

Supply Order Status 138

Supply order status is used to calculate the assembly delay projections and "can-delivery" projections. The status information of each supply order is given by the supplier of that order. The status information needs to have the expected delay (or early delivery) of the order along with other useful information such as reason for delay, or any other changes in the order. We denote the supply status by SSD[i,k] for component i and assembly k. This is the current anticipated delay in delivery against the original planned assembly date. If early delivery is anticipated, then it takes a negative value. It is expressed in days.

Table 138 shown in FIG. 2G illustrates exemplary supply order status data.

Inventory Policy Type 142

Calculation of the safety factor and of the times of supply orders depends on the inventory policy. There can be many different policies. We will focus on five of them here.

1. Optimize safety factor. In this case, the safety factor is optimized. This means, supply inventory is minimized so as not to exceed an average supply delay target set by the user. Since each component has different costs and their supply lead times show different characteristics (i.e. mean, and standard deviation), at optimality each component has a different safety factor. For instance, more expensive items with shorter lead times, and smaller lead time variability, will tend to have smaller safety factors (leading to lower inventory levels) and others will tend to have higher safety factors (leading to higher inventory levels). Safety factors are optimized through an optimization algorithm that we will give in detail later.
2. Fixed safety factor. In this case, the user specifies what safety factor is to be used for the component. There may be special reasons for the user to choose this option, such as contractual obligations or manufacturing policy.
3. Availability based safety factor. In this case, the user specifies a target availability level for the component, and the safety factor that provides that availability level is calculated by the system. The availability level is defined by the probability of on time delivery of the supply, and on time delivery means the supply arrives before the planned assembly date.
4. Worst case supply lead time. This is a conservative policy that uses a safety factor that will guarantee no supply delay if the supply lead time is not longer than the historical maximum.
5. Best case supply lead time. This is an optimistic policy that uses a safety factor that assumes supply lead time can be as short as the historical minimum.

Inventory policy type is stored in parameter POLICY[i] for component i and takes a value indexed to the policy options. In the above example list of five policy options, the value for the POLICY[i] index would be one of the values 1, 2, 3, 4, or 5.

Table 142 shown in FIG. 2H illustrates exemplary inventory policy type data.

Optimal Times for Supply Order 122

Here the term "optimal" means that the supply order times are calculated based on policy types desired by the user. That is, one of the five alternative policies mentioned above is applied for each component.

In order to calculate the optimal time for supply order for a component, the safety factor is calculated first. Then, safety lead times are calculated. Safety lead times indicate how early the supply orders should be placed above and beyond the average supply lead times in order to control the chance of supply delays that would cause delays in assembly process.

Safety lead time is always calculated as follows:

SLTIME[i]=SFACTOR[i]*HSSLT[i]

Optimal supply order lead time is how far in advance of the planned assembly date a component should be ordered. It is calculated as follows:

OLTIME[i]=HASLT[i]+SLTIME[i]

Once the optimal supply order lead time is calculated, the optimal time for placing the supply order can easily be calculated by subtracting the optimal supply order lead time from the planned assembly start date. That is, OOTIME[i,k]=PSTART[k]−OLTIME[i]

Table 122 shown in FIG. 2J illustrates exemplary optimal supply order times data.

MRP (Materials Requirements Planning) Engine 150

MRP is a well established method and widely used in practice. The general principal of MRP is to calculate the supply timing based on the lead times at several stages of manufacturing/supply/distribution operations. However, MRP has some restrictions. An important restriction of MRP in the context of this method is that its plans are done assuming known lead times. If lead times are uncertain, MRP does not calculate the appropriate levels of "safety factors" to calculate optimal order lead times. The method described here should feed the safety factors to MRP in order to update the order schedules generated by MRP. In this way, delays in supply can be controlled at desired levels.

Supply Order Schedule 152

This is the output of the MRP engine described in method element 150. More specifically, let us assume that MRP sets the supply order date for component i to be used in assembly process k at MRPOTIME[i,k]. Then the modified date for this particular supply order is MRPOTIME[i,k]+SLTIME[i].

The second term in this expression is the safety lead time that the method calculates (as described in the method element 122), which takes into account the uncertainty in the lead times.

Table 152 shown in FIG. 2K illustrates exemplary supply order schedule data.

Assembly Delay Projections 124

Expected supply delay for component i is calculated by assuming that the supply lead times have normal distribution with mean HASLT[i] and standard deviation HSSLT[i]. Other probability distributions can also be used. The calculation of expected supply delay for component i to assembly process k is done against the planned assembly date. It is done as follows:

ZVALUE[i,k]=(OLTIME[i]+SSD[i,k]−HASLT[i])/HSSLT[i]

ESDP[i,k]=HSSLT[i]*(pdfstdnormal(ZVALUE[i,k])+ZVALUE[i,k]*(1−cdfstdnormal(ZVALUE[i,k])))

The total estimated supply delay for assembly process k against the planned start date of the assembly is given by the following:

$TESDP[k]=\max(ESDP[i,k]$ for all $i=1,2,\ldots, I[k])$

Table 124 shown in FIG. 2L illustrates exemplary assembly delay projection data.

Projections of "Can-Deliver" Dates 126

Being able to start assembly process at a given date PSTART[k] with a given level of confidence means we have all the components available for assembly with a certain probability. The probability here gives us the confidence level. The date we can start the assembly process is called the "can start" date and it can be estimated as follows:

$CSTART[k]=PSTART[k]+\max(JSD[i,k]$ for all $i=1,2,\ldots, I[k])$ where $JSD[i,k]=\max(0,\min(HMAXSLT[i], \text{invcdfnormal}(CLEVEL[k]^{(1/I[k])},0,1)*HSSLT[i]+HASLT[i])-(OLTIME[i]-ESDP[i,k]))$ Sometimes, a different date for assembly may be requested due to changes in customer requirements, etc. In this case, it may be desirable to calculate the estimated delay beyond the requested date, RSTART[k]. This delay can be calculated as follows:

$TESDR[k]=\max(ESDR[i,k]$ for all $i=1,2,\ldots, I[k])$ where $ESDR[i,k]=HSSLT[i]*(pdfstdnormal(ZVALUE[i,k])-ZVALUE[i,k]*(1-cdfstdnormal(ZVALUE[i,k])))$ $ZVALUE[i,k]=(OLTIME[i]+SSD[i,k]+RSTART[k]-PSTART[k]-HASLT[i])/HSSLT[i]$ If it is desired to calculate the chance of being able to start the assembly at the requested date, this can be calculated as follows:

$PONTIMEA[k]=product(PONTIMEC[i,k]$ for all $i=1,2,\ldots, I[k])$ where $PONTIMEC[i,k]=cdfstdnormal(ZVALUE[i,k])$ $ZVALUE[i,k]=(OLTIME[i]+SSD[i,k]+RSTART[k]-PSTART[k]-HASLT[i])/HSSLT[i]$ Table 126 shown in FIG. 2M illustrates exemplary "can-deliver" dates data.

What-if Analysis 128

When the supply timing planning is done, there may be a number of questions useful to answer in the planning and execution process. We will show some of them and others can be handled similar to the illustrations here.

We will list three "what-if" questions here and show how answers can be generated.

1. If average supply lead time performance of a component (or a group of components) changes, what happens to the "can start" date for assembly and the projected assembly delay?
2. If supply lead time performance (as measured by coefficient of variation) of a component (or a group of components) changes, what happens to the "can start" date for assembly and the projected assembly delay?
3. If a component (or a group of components) is (are) delayed for some time, what happens to the "can start" date for assembly and the projected assembly delay?

Case 1: In order to answer this question, the user enters the value of change for the average lead time in percent terms. Then, the average supply lead time is updated as follows:

$HASLTNEW[i]=HASLT[i]*(1+ASLTCHANGE[i])$.

Then calculations described in method elements 124 and 126 are performed after replacing HASLT[i] by HASLTNEW[i].

Case 2: In order to answer this question, the user enters the value of change for the variability of lead time in percent terms. Then, the average supply lead time is updated as follows:

$HSSLTNEW[i]=HSSLT[i]*(1+SSLTCHANGE[i])$.

Then calculations described in method elements 124 and 126 are performed after replacing HSSLT[i] by HSSLTNEW[i].

If both average lead time and variability of lead time change, then the new standard deviation is calculated as follows:

$HSSLTNEW[i]=(HASLTNEW[i]/HASLT[i])*HSSLT[i]*(1+SSLTCHANGE[i])$.

Case 3: In order to answer this question, the user enters the value of anticipated delay in supply order delivery (in days). Then, this new delay (denote it by SSDNEW[i,k]) replaces the old one (i.e. SSD[i,k]). Then calculations described in method elements 124 and 126 are performed to answer the questions.

Table 128 shown in FIG. 2N illustrates exemplary what-if analysis data. These "what-if" questions are important for the operations managers to simultaneously control i) the assembly delays and on time delivery of completed products to customers and ii) component inventory. Accurate answers to these "what-if" questions require the above described method of this invention, and in particular the way the method of the invention links component supply delays to assembly delay, and the way it calculates the probabilities of on time starts of assemblies. Many planning systems particularly MRP does not incorporate uncertainties in the planning and hence is not able to generate probabilities of on time starts or does not able to estimate the amounts of delays. Inventory optimization techniques that are common on the other hand calculate "safety stocks" rather than "safety lead times". Safety stocks require monitoring the inventory position and they tend to work well for products with high demand volume. For complex and expensive products that do not have high volumes safety stocks do not accurately show the optimal times of placing supply orders to feed scheduled assemblies of such products.

Supplier's Performance Monitoring Engine 110

This engine is used to keep track of supply performance statistics calculated in method element 132, and allows users to update current projected delays in supply delivery for each component and each assembly process (described in method element 138). Based on these data, it calculates estimates of lead time delivery performance statistics for the future assembly processes (described in method element 112).

The engine reports all historical and current lead time performance statistics and the improvements. This helps the operations managers keep the supply arrivals in check. If any supplier's performance falls short of the targets, suppliers can be notified and requests for improvements can be made or negotiations can be triggered.

Component Inventory Optimization Engine 120

This engine calculates the safety factors according to the desired specifications by the user. That is, the user can specify the policy type desired for each component. There are five policy types described in method element 142. The engine calculates the safety factors for all components. The safety factor for each component depends on the policy type selected for that component:

Safety factor for each policy type is calculated as follows:
If POLICY[i]=1 (Optimize safety factor)
    then calculate SFACTOR[i] using the optimization algorithm.

If POLICY[i]=2 (Use fixed safety factor)
  then get SFACTOR[i] as an input from the user.
If POLICY[i]=3 (Use availability target based safety factor)
  then SFACTOR[i]=invcdfnormal(ATARGET[i], HASLT[i], HSSLT[i])
If POLICY[i]=4 (Use worst case supply lead time safety factor)
  then SFACTOR[i]=(HMAXSLT[i]−HASLT[i])/HSSLT[i]
If POLICY[i]=5 (Use best case supply lead time safety factor)
  then SFACTOR[i]=(HMINSLT[i]−HASLT[i])/HSSLT[i]

The inventory optimization algorithm that calculates the safety factors SFACTOR[i] for all components is given below.

Inventory Optimization Algorithm

If policy type is 1 then an optimization of the safety factor is performed by using an optimization algorithm.

This optimization algorithm solves the following problem:
Minimize over S[i], i=1, ..., N:
sum{h[i]E[max{T[i]+S[i]−L[i],0}], i=1, ..., N]}
Subject to:
E[max{L[i]−T[i]−S[i],0}]<=α for all i=1, ..., N.

Here E[X] means the expected value of random variable X.
What is to be minimized here is the inventory holding cost of all components.

The constraint states that we want the expected value of the component delay for each component to be no more than a target value alpha.

The definitions of the parameters used in the formulation are below:
  i: Index for components to be optimized.
  N: Total number of components to be optimized.
  h[i]: Inventory cost of holding component I for a day in inventory.
  T[i]: Mean supply lead time for component i. It is equal to HASLT[i].
  L[i]: Actual supply lead time for component and it is an unknown normally distributed random variable with mean HASLT[i] and standard deviation HSSLT[i].
  S[i]: Safety lead time for component i. It is equal to SLTIME[i].
  α: Target supply delay to final assembly (in days). It is also called DELAYTOLERANCE (see below). This is the amount of delay we can tolerate for the assembly to start on time at the planned date. It is an input by the user.

We will use the following parameters in the optimization algorithm:
  LAMBDA: Lagrange multiplier (needed for constrained optimization).
  DELAYTOLERANCE: Target assembly process delay (in days) due to delays in component supply.
  COST[i]: Unit cost of component i (purchase cost if supplied, manufacturing cost if manufactured).
  LTMEAN[i]: Sample mean of lead time observations for component i. This is the average supply lead time for component i. Historical lead times are used to calculate this if there is not a better estimate for it. Therefore, it is equal to HASLT[i].
  LTSTDEV[i]: Sample standard deviation of lead time observations for component i. This is the standard deviation of supply lead time for component i. Historical lead times are used to calculate this if there is not a better estimate for it. Therefore, it is equal to HSSLT[i].
  LTMAX[i]: Sample maximum of lead time observations for component i. Historical lead times are used to calculate this if there is not a better estimate for it. Therefore, it is equal to HMAXSLT[i].
  LTMIN[i]: Sample minimum of lead time observations for component i. Historical lead times are used to calculate this if there is not a better estimate for it. Therefore, it is equal to HMINSLT[i].
  ATARGET[i]: Availability probability target for component i. It is a user input to the calculations.
  POLICY[i]: Inventory policy type for component i. It takes values from 1 to 5. see 142.
  SFACTOR[i]: Safety factor for timing the supply order for component i.
  SUMDELAY: Total projected delay in final assembly due to component supply shortages (in days).
  DELAY[i]: Projected delay in the supply of component i (in days).
  INVENTORY[i]: Projected amount of inventory (in units) at final assembly for component i.
  INVENTORY$[i]: Projected amount of inventory (in dollars) at final assembly for component i.
  NORMINV(x,y,z): This is the inverse of normal distribution function evaluated at x. The normal random variable has a mean of y and standard deviation of Z.
  Z[i]: This is the z-value of standard normal distribution. It is equal to the ratio: (S[i]−LTMEAN[i])/LTSTDEV[i].
  PDF[i]=NORMDIST(Z[i],0,1,FALSE): This is the Probability Density Function of standard normal random variable (i.e. mean=0, standard deviation=1) evaluated at Z[i].
  CDF[i]=NORMDIST(Z[i],0,1,TRUE): This is the Probability Distribution Function of standard normal random variable (i.e. mean=0, standard deviation=1) evaluated at Z[i].
  G[i]=PDF[i]−Z[i]*(1−CDF[i]): This is the G-function used in inventory control theory. It measures the expected amount of random supply lead time above and beyond the level S[i].

---

Algorithm 1: Calculating optimal order times

1. Get Inputs: DELAYTOLERANCE, COST[i], LTMEAN[i], LTSTDEV[i], LTMAX[i], LTMIN[i], ATARGET[i], POLICY[i].
2. Calculate MAXLAMBDA (see Algorithm 2).
3. Let LAMBDA = MAXLAMBDA.
4. Let SUMDELAY = 0.
5. Let INCREMENT = MAXLAMBDA.
6. Let ITERATION = 1.
7. Do while ITERATION < 60:
    1. Calculate SUMDELAY (see Algorithm 3).
    2. Let INCREMENT = 0.5*INCREMENT
    3. IF SUMDELAY > DELAYTOLERANCE
        THEN Let LAMBDA = LAMBDA + INCREMENT
        ELSE Let LAMBDA = LAMBDA − INCREMENT
    4. Let ITERATION = ITERATION + 1.
    5. Continue
8. Stop.
9. Report SUMDELAY, DELAY[i], INVENTORY[i], INVENTORY$[i], SFACTOR[i].

Algorithm 2: Calculation of MAXLAMBDA

1. Let SUMDELAY = 0
2. Let LAMBDA = 1,000,000.
3. Do While SUMDELAY > DELAYTOLERANCE
   1. Calculate SUMDELAY
   2. Let LAMBDA = 2*LAMBDA
   3. continue
4. Stop.
5. Let MAXLAMBDA = LAMBDA
6. Report MAXLAMBDA.

Algorithm 3: Calculation of SUMDELAY

1. Let SUMDELAY = 0. Let i=1.
2. Do While i < N+1
   1. If POLICY [i]=1 then
      Let SFACTOR[i] =
      NORMINV(LAMBDA/(LAMBDA+COST[i]),LTMEAN[i],LTSTDEV[i])/LTSTDEV[i]–
      LTMEAN[i]/LTSTDEV[i]
   2. If POLICY[i]=2 then
      Set SFACTOR[i] to the input value
      given by the user
   3. If POLICY[i]=3 then
      Set SFACTOR[i] =
      invcdfnormal(ATARGET[i], LTMEAN[i], LTSTDEV[i])
   4. If POLICY[i]=4 then
      Set SFACTOR[i] = (LTMAX[i] – LTMEAN[i])/LTSTDEV[i]
   5. If POLICY[i]=5
      then SFACTOR[i] = (LTMIN[i] – LTMEAN[i])/LTSTDEV[i]
   6. Let S[i] =
      LTMEAN[i]+SFACTOR[i]*LTSTDEV[i]
   7. Let Z[i] = (S[i] – LTMEAN[i]) / LTSTDEV[i]
   8. Let PDF[i] = NORMDIST(Z[i],0,1,FALSE)
   9. Let CDF[i] = NORMDIST(Z[i],0,1,TRUE)
   10. Let G[i] = PDF[i] – Z[i]*(1–CDF[i])
   11. Let DELAY[i] = LTSTDEV[i]*G[i]
   12. Let INVENTORY[i]=S[i]–LTMEAN[i]+DELAY[i]
   13. Let INVENTORY$[i]=COST[i]*INVENTORY[i]
   14. Let SUMDELAY = SUMDELAY + DELAY[i]
   15. Let i=i+1
   16. Continue.
3. Stop.
4. Report SUMDELAY, DELAY[i], INVENTORY[i], INVENTORY$[i], SFACTOR[i].

Note that the safety factors this algorithm calculates are conservative. In other words, the total supply delays would be shorter than targets when the solution of this algorithm is implemented. Other algorithms can be used to calculate safety factors that are not conservative. Simulation can be used as a technique when analytical calculations are not possible. Note also that the optimization algorithm takes into account the cost of all components simultaneously and calculates the best lead time safety factors that minimize the component inventory costs. Components are not optimized independently of each other.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A computer system for managing component supply for assembly of complex products, comprising:
   a monitoring engine implemented in software and operating on said computer system for prompting improved supply lead time performance of one or more suppliers of respective one or more components of a complex assembly; and
   an optimization engine implemented in software and operating on said computer system for using said improved supply lead time performance to generate supply order times, for each respective component, that keep an expected supply delay for the respective component within a target delay tolerance for the component,
   the optimization engine having means for using supply lead time uncertainty and component costs relative to other components in performing optimization.

2. The system of claim 1, wherein the monitoring engine further comprises, for each component:
   means for measuring an historical record of delivery delay by the supplier of the respective component;
   means for obtaining from the supplier at periodic intervals an estimated delivery delay for each component item in a delivery pipeline of the supplier;
   means for calculating in said delivery pipeline an improvement factor that compares the estimated delivery delay with the historical delivery delay.

3. The system of claim 2, wherein the optimization engine further comprises:
   means for selecting for each component an inventory policy for determining a safety factor for the component;
   means for calculating a safety factor for each component in accordance with the selected inventory policy;
   means for determining a target delay tolerance for each component;
   means for calculating an expected supply delay for each component; and
   means for calculating the supply order time for each component so that the expected supply delay is within said target delay tolerance.

4. The system of claim 3, wherein the historical record of delivery delay is described by a standard probability density.

5. The system of claim 4, wherein the improvement factor is calculated for a mean value, a standard deviation from the mean, a maximum value, and a minimum value.

6. The system of claim 3, wherein the calculated supply order time and calculated safety factor are provided to a materials requirements planning (MRP) engine.

7. The system of claim 3, wherein one of said respective policies uses an optimization algorithm to calculate the respective safety factor.

8. The system of claim 7, wherein the optimization engine uses a cost for each component to optimize a total cost of inventory.

9. The system of claim 1, further comprising
   means for presenting to a manager projections of an effect of an unexpected supply delay for a component upon an assembly schedule for said complex assembly; and
   means for said manager to request from a supplier of said component faster delivery of said component in response to said projection.

10. The system of claim 1, wherein the generated supply order times are provided to a materials requirements planning (MRP) engine.

11. A computer implemented method for managing component supply for assembly of complex products, the computer performing the steps of:

monitoring, so as to prompt improvement in, supply lead time performance of one or more suppliers of components of a complex assembly;

generating, from a measure of said prompted improvement in supply lead time performance, supply order times for each component that keep an expected supply delay for a component within a target delay tolerance for the component, and generating said measure using supply lead time uncertainty and component costs relative to other components.

12. The method of claim 11, wherein the monitoring further comprises, for each component:

measuring an historical record of delivery delay by the supplier of the respective component;

obtaining from the supplier at periodic intervals an estimated delivery delay for each component item in a delivery pipeline of the supplier;

calculating in a delivery pipeline an improvement factor that compares the estimated delivery delay with the historical delivery delay.

13. The method of claim 11, further comprising presenting to a manager projection of an effect of an unexpected supply delay for a component upon an assembly schedule for said complex assembly; and requesting by said manager from a supplier of said component faster delivery of said component in response to said projection.

14. The method of claim 13, wherein said projected effects include delay in completion of said assembly schedule or change in "can-deliver"dates for said assembly.

15. The method of claim 11, wherein the generated supply order times are provided to a materials requirements planning (MRP) engine.

16. A computer implemented system for managing component supply for assembly of complex products, comprising:

first computer code on said computer implemented system for monitoring, so as to prompt improvement in, supply lead time performance of one or more suppliers of respective one or more components of a complex assembly; and second computer code on said computer implemented system for generating, from a measure of said prompted improvement in supply lead time performance, supply order times for each respective component that keep an expected supply delay for the respective component within a target delay tolerance for the component, wherein supply lead time uncertainty and component costs relative to other components are used by means for generating said measure.

17. The computer implemented system of claim 16, wherein said first computer code for monitoring further comprises:

third computer code for measuring, for each component, an historical record of delivery delay by the supplier of the respective component;

fourth computer code for obtaining from the supplier of each component at periodic intervals an estimated delivery delay for each component item in a delivery pipeline of the supplier;

fifth computer code for calculating, for each component in a delivery pipeline, an improvement factor that compares the estimated delivery delay with the historical delivery delay.

* * * * *